United States Patent
Santhanam

(10) Patent No.: US 8,077,650 B2
(45) Date of Patent: Dec. 13, 2011

(54) METHODS OF ANNOUNCING A CALL AND TRANSMITTING APPLICATION DATA TO AN ACCESS TERMINAL IN A WIRELESS COMMUNICATIONS SYSTEM

(75) Inventor: Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 12/242,444

(22) Filed: Sep. 30, 2008

(65) Prior Publication Data

US 2010/0080179 A1    Apr. 1, 2010

(51) Int. Cl.
*H04H 20/71*    (2008.01)
*H04B 7/005*    (2006.01)
*H04W 24/00*    (2009.01)
*H04B 7/00*    (2006.01)

(52) U.S. Cl. ............ 370/312; 370/278; 455/456.1; 455/456.5; 455/515; 455/518; 455/519

(58) Field of Classification Search .......... 370/278, 370/312; 455/518, 519, 456.1, 456.5, 515
See application file for complete search history.

(56) References Cited

U.S. PATENT DOCUMENTS

| | | | |
|---|---|---|---|
| 5,875,400 A * | 2/1999 | Madhavapeddy et al. .... | 455/458 |
| 6,842,619 B2 * | 1/2005 | Lee et al. ................. | 455/453 |
| 2004/0157619 A1 | 8/2004 | Corson et al. | |
| 2004/0176147 A1 * | 9/2004 | Escalante ................. | 455/574 |
| 2005/0113114 A1 * | 5/2005 | Asthana ................... | 455/456.3 |
| 2005/0124366 A1 * | 6/2005 | Hassan et al. ............. | 455/518 |
| 2006/0014551 A1 | 1/2006 | Yoon et al. | |
| 2007/0049314 A1 | 3/2007 | Balachandran et al. | |
| 2007/0184840 A1 * | 8/2007 | Zhang et al. .............. | 455/442 |
| 2007/0192439 A1 * | 8/2007 | Bhaskaran ................ | 709/219 |
| 2007/0238442 A1 * | 10/2007 | Mate et al. ................ | 455/403 |
| 2007/0254679 A1 | 11/2007 | Montojo et al. | |
| 2008/0014968 A1 | 1/2008 | Yoon | |
| 2009/0129307 A1 * | 5/2009 | Akhtar et al. ............. | 370/312 |
| 2009/0135744 A1 * | 5/2009 | Chaudhri et al. .......... | 370/278 |
| 2009/0170527 A1 * | 7/2009 | Liu ........................ | 455/456.1 |

FOREIGN PATENT DOCUMENTS

| | | |
|---|---|---|
| EP | 1909524 | 4/2008 |
| WO | WO2007007125 | 1/2007 |
| WO | WO2008076763 | 6/2008 |

OTHER PUBLICATIONS

3GPP2, "CDMA2000 High Rate Broadcast-Multicast Packet Data Air Interface Specification," Feb. 14, 2006, Version 1.0, C.S0054-A, pp. 1-169.
ETSI 3GPP: "Universal Mobile Telecommunications System (UMTS); Transferring of emergency call data (3GPP TR 22.967 version 7.0.0 Release 7)" Mar. 1, 2006, XP014035379, pp. 1-25.

* cited by examiner

*Primary Examiner* — Ayaz Sheikh
*Assistant Examiner* — Tarell Hampton
(74) *Attorney, Agent, or Firm* — Raphael Freiwirth

(57) ABSTRACT

Exemplary embodiments of the present invention are directed to systems and methods for announcing a call to an access terminal in a wireless communications system. Receiving, at an access network, a request to call a given access terminal and determining whether a cluster to which the given access terminal belongs is known at the access network by querying a location database. The location database includes a list of access terminals and clusters, which themselves include sectors of the wireless communications system. Thereafter, transmitting an announce message announcing the requested call to the given access terminal based on the determination of whether the cluster is known to the access network.

47 Claims, 27 Drawing Sheets

RUP transmission procedure

Example of DOS-announce message scheduling on control channel

Another example of DOS-announce message scheduling on control channel

METHODS OF ANNOUNCING A CALL AND TRANSMITTING APPLICATION DATA TO AN ACCESS TERMINAL IN A WIRELESS COMMUNICATIONS SYSTEM

BACKGROUND OF THE INVENTION

1. Field of the Invention

The invention relates to communications in a wireless communications system and, more particularly to methods of announcing a call to an access terminal in a wireless communications system.

2. Description of the Related Art

Wireless communication systems have developed through various generations, including a first-generation analog wireless phone service (1G), a second-generation (2G) digital wireless phone service (including interim 2.5 G and 2.75 G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Exemplary embodiments of the present invention are directed to systems and methods for announcing a call to an access terminal in a wireless communications system. Receiving, at an access network, a request to call a given access terminal and determining whether a cluster to which the given access terminal belongs is known at the access network by querying a location database. The location database includes a list of access terminals and clusters, which themselves include sectors of the wireless communications system. Thereafter, transmitting an announce message announcing the requested call to the given access terminal based on the determination of whether the cluster is known to the access network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
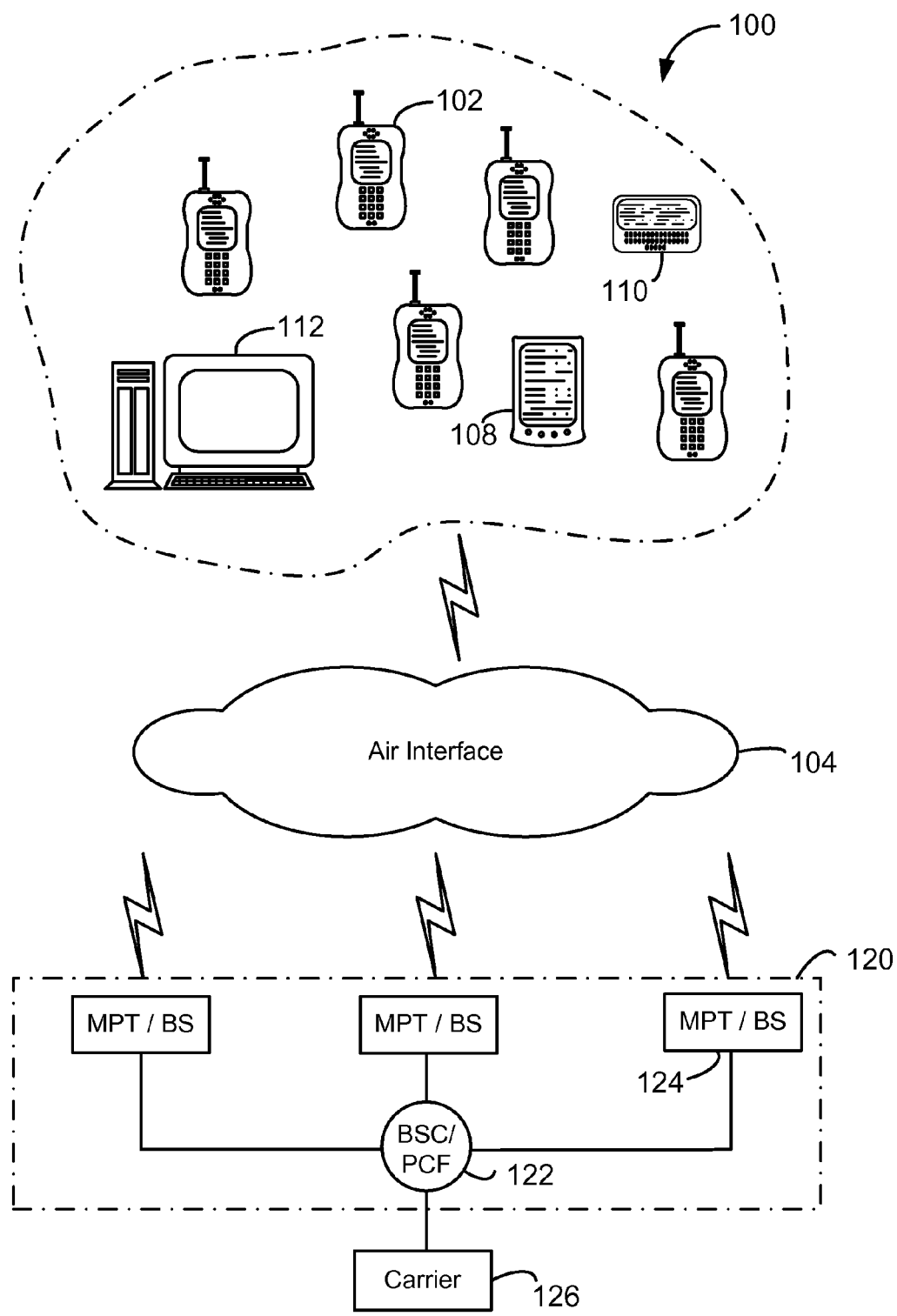
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
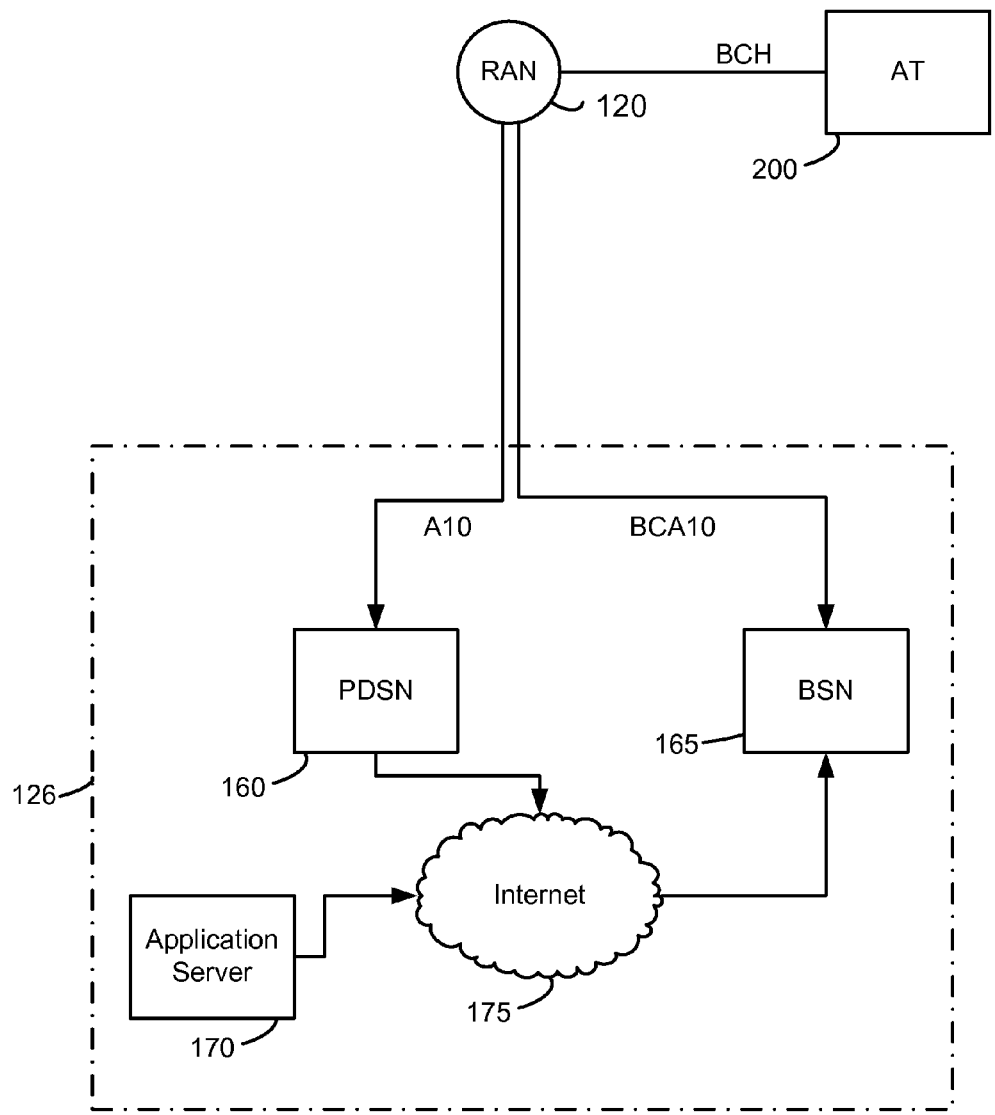
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
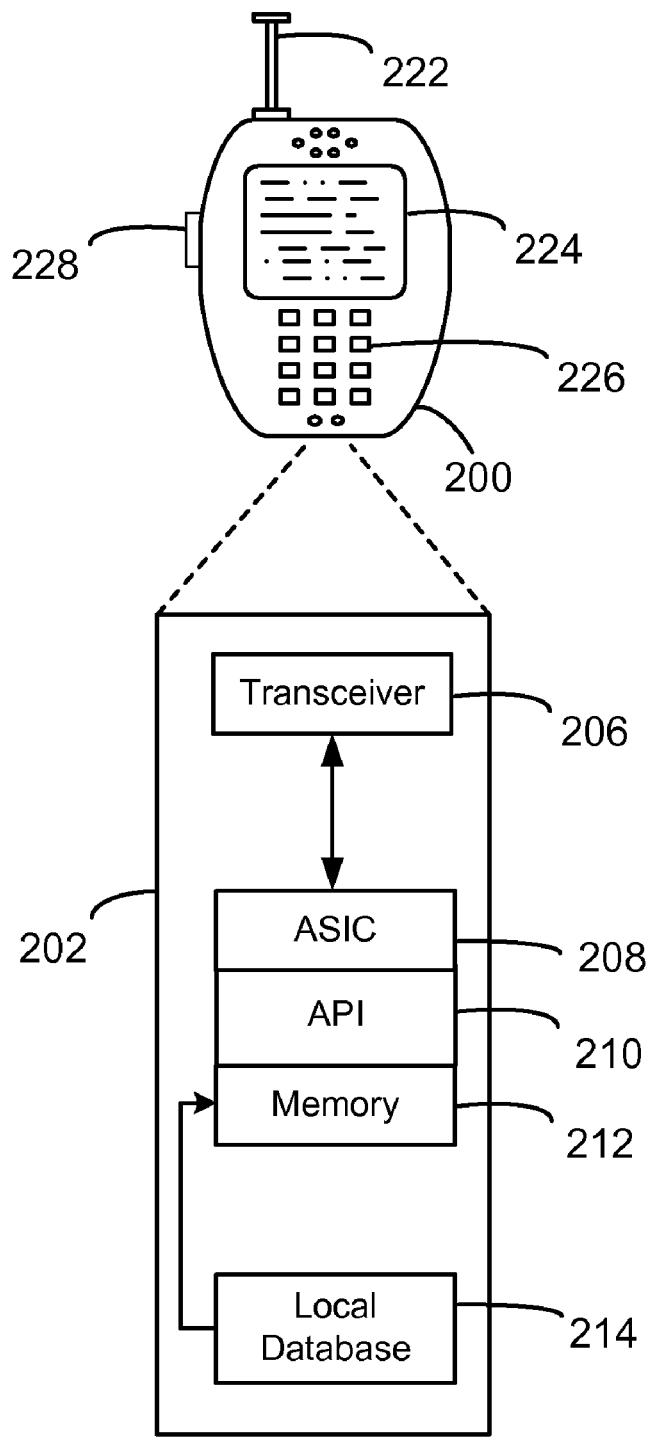
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Overview of Sending an Announce Message to Access Terminals in Wireless Communication Systems Conventionally, in order to announce a call to a particular access terminal, the RAN 120 broadcasts a page on a downlink paging channel in each sector of a paging zone (e.g., the subnet of one or more BSCs 122 or RNCs) upon arrival of a call (e.g., from the PDSN 160, the BSN 165, etc.) for a target access terminal (e.g., for unicast communications) or terminals (e.g., for a multicast communication). Upon receiving the broadcasted page on the downlink paging channel, the target access terminal sets up a traffic channel for the call. After establishing the traffic channel, the RAN 120 can transmit, within the sector that includes the target access terminal, the Announce message over the established traffic channel on the forward link (F-TCH) over the air interface 104 to the target access terminal.

Alternatively, the RAN 120 can broadcast the Announce message in each sector of the paging zone without first paging the access terminal to determine its sector location. In this case, the RAN 120 transmits the Announce message as a data over signaling (DOS) message over the downlink Control Channel in each sector of the paging zone. The broadcasted Announce message approach is referred to as Direct DOS.

Table 1 (below) illustrates an example of delays from the time of transmission of the Announce message by the RAN 120 to the time of arrival of the Announce message at the target access terminal for each of the above-described approaches (i.e., Standard paging vs. Direct DOS). In Table 1, the $50^{th}$, $90^{th}$ and $95^{th}$ percentiles correspond to the percentage of ATs that have received a page for a call (e.g., a multicast call, a unicast call, etc.), assuming that the AT is in the network and that the page and the MT-DOS message are scheduled on the initial CC medium access control (MAC) packet on the nearest synchronous or sub-synchronous CC capsule. As shown in Table 1 (below), the Direct DOS approach can lead to significant reductions in delay. However, transmitting the Announce message via Direct DOS unconditionally in all sectors of a paging zone can degrade forward link capacity by increasing the load on the downlink Control Channel. For example, the overloading on the control channel can occur in unconditional (i.e., universal or global) Direct DOS because an Announce message can be relatively large (e.g., 60 bytes in length), and the downlink Control Channel has a limited amount of capacity available for transmissions at each paging cycle. Accordingly, the delay reductions associated with Direct DOS are offset by the load increase on the downlink Control Channel.

TABLE 1

| Announce Delivery Method | $50^{th}$ percentile (msec) | $90^{th}$ percentile (msec) | $95^{th}$ percentile (msec) |
|---|---|---|---|
| Standard Paging | 337 | 438 | 539 |
| Direct DOS | 142 | 236 | 243 |

Traffic Load and Capacity Constraints

The arrival rate distribution of the Announce message in a paging zone at each paging cycle will now be described as determined based on an example call model. Then, a method of determining the payload available in the downlink Control Channel packets in order to transport one or more Announce messages will be described.

1. Example Traffic Model

An example call model, which is used to explain embodiments of the present invention presented below, will now be described. It is understood that the call model described below is merely on example that may be used in accordance with embodiments of the present invention, and that the invention is not intended to be limited to this particular call model. Accordingly, assume that the example call model is characterized by an average call rate per user in a "busy hour" is 1.45 calls per user, per hour. Assuming that the target(s) of a call are equally likely to be in any sector in the service provider's network, the average number of calls arriving in a sector is the same as the average number of calls emanating from within a sector. For the sake of numerical analysis, assume the number of cells in a paging zone be 50. Assuming each cell has three sectors, there are 150 sectors in a paging zone. Assuming that each sector carrier in a paging zone has 333 registered users, the total number of registered users in a paging zone is 333*3*50=50,000 users/paging zone/carrier. The average rate of call arrival into a paging zone denoted by $\lambda$ is 3*50*333*1.45 calls/paging-zone/hour. The average call arrival rate in a paging zone per paging cycle duration of 426 msec is given by Equation 1:

$$\lambda=(3*50*333*1.45/3600)*0.426 \approx 8.57 \text{ calls/paging-zone/paging-cycle.} \quad \text{Equation 1}$$

Figure 4:
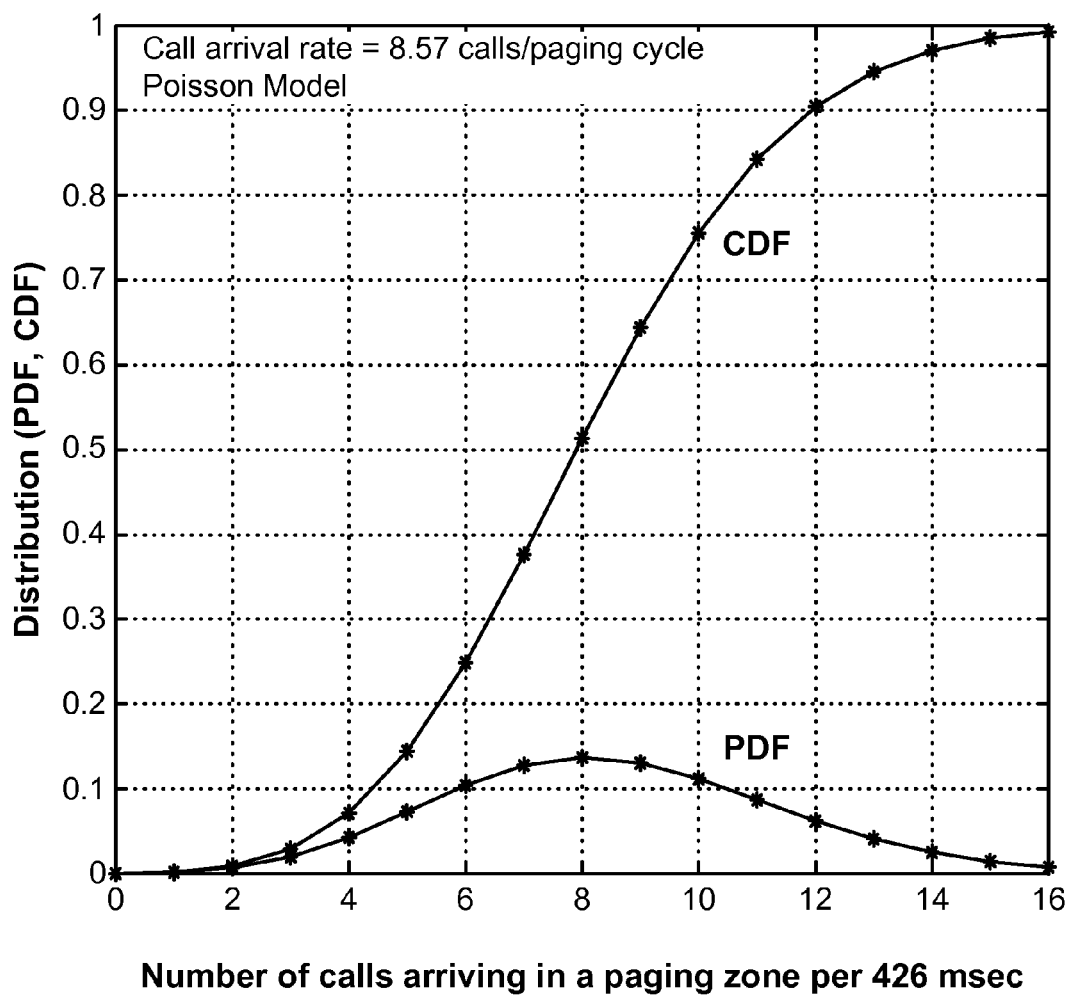
FIG. 4 illustrates a probability distribution of one or more calls arriving in a paging zone in a 426 millisecond (msec) window according to an embodiment of the present invention.

Assuming that the call arrival process follows a Poisson distribution with intensity $\lambda$, the probability of K calls arriving into a paging zone with intensity $\lambda$ is plotted in FIG. 4. FIG. 4 illustrates a probability distribution of one or more calls arriving in a paging zone in a 426 msec window under the assumptions expressed above. In particular, FIG. 4 illustrates a probability density function (PDF) curve and a cumulative density function (CDF), as is known in the art.

Referring to FIG. 4, the PDF curve indicates that the arrival rate of three or more calls is relatively high (i.e., ~96%). Each arriving call denotes the arrival of an Announce message at the RAN 120, and the CDF/PDF curves correspond to the CDF/PDF of Announce messages arriving at a paging zone in a given paging cycle. In an example, for multicast group calls (e.g., push-to-talk (PTT) group calls, such as QChat, multiple Announce messages are transmitted. However, for the sake of simplicity, the examples provided below are directed to "direct" or unicast calls.

Referring to FIG. 4, the high arrival rate of Announce messages into a paging zone and the large size of an Announce message indicates that an unconditional Direct DOS approach over an entire paging zone is relatively impractical. As will be appreciated, the available capacity of the downlink Control Channel in each sector affects whether the direct DOS approach is feasible on a per-sector basis. The downlink Control Channel capacity will now be described in greater detail

2. Control Channel Capacity

In an example, in a 1xEVDO Rev. A network, the downlink Control Channel can operate at either 38.4 Kbps or 76.8 Kbps and can transmit one or more MAC packets having a size of 1024 bits. The MAC and physical layer overhead in transmitting a single MAC packet (called an SCC capsule) is enumerated in Table 2 (below). Referring to Table 2, only 928 bits of a 1024-bit physical layer control channel (CC) packet is available for transmission of data. A number of overhead messages are transmitted over the Control Channel in this SCC capsule. These overhead messages and their periodicity are listed in table 3 (below). Generally, the frequency of transmission of these overhead messages is a variable that can be adjusted. However, for convenience of explanation, the examples provided below will treat the overhead message transmission frequency as being constant. The delay in delivering the multiple MT-DOS (ANNOUNCE) messages over the synchronous CC and the associated delays are provided in table 4 (below).

TABLE 2

| Layer | Overhead (bits) | Payload (bits) |
|---|---|---|
| SNP | 8 | 928 |
| SLP | 6 | 936 |
| Stream | 2 | 942 |
| Session | 0 | 944 |
| Connection | 0 (Format A) | 944 |
| Security | 0 (No Security) | 944 |
| MAC header | 48 | 944 (one MAC header) |
| Control Channel Header + Tail | 8 + 2 | 992 |
| Physical | 22 | 1002 |

TABLE 3

| Message | Size in Bits | Frequency of Transmission |
|---|---|---|
| Sync | 66 bits | Every 3 CC cycles |
| QuickConfig | 108 bits | Every CC cycle |
| SectorParameters | 264 bits | Every 3 CC cycles |
| AccessParameters | 264 bits | Every 3 CC cycles |

TABLE 4

| # of Announce messages | Payload required | # of 1024-bit CC Packets and available capacity | 50th percentile early decoding delay | 95th percentile early decoding delay |
|---|---|---|---|---|
| 1 | 64 bytes | 1 packet (102 bytes) | 1.67 ms | 15 ms |
| 2 | 128 bytes | 2 packets (204 bytes) | 104 ms | 117 ms |
| 3 | 192 bytes | 2 packets (204 bytes) | 104 ms | 117 ms |
| 4 | 256 bytes | 3 packets (306 bytes) | 206 ms | 219 ms |

Accordingly, Table 4 (above) illustrates payload requirements and OTA Delay in transmitting multiple DOS messages in a SCC capsule with an available payload of 102 bytes in the first SCC packet, and Table 5 (above) illustrates payload requirements and OTA Delay in transmitting multiple DOS messages in a SCC capsule with an available payload of 50 bytes in the first SCC packet.

DOS Flooding of Announce Messages

Below, an unconditional Direct DOS (or mobile-terminated (MT)-DOS) approach for transmitting Announce messages is described, followed by a cluster-based approach according to an embodiment of the present invention.

1. Unconditional Direct DOS flooding of Announce Message

As discussed above, the large size of the Announce message makes an unconditional Direct DOS approach for an entire paging zone an expensive solution in terms of bandwidth on the downlink Control Channel. A simple approach to flooding the Announce message across an entire paging zone is to simply broadcast as many DOS messages as possible while still leaving room for Page messages. In the worst case scenario, with the assumptions from the previous section, 2 SCC MAC packets have a total capacity of 102+50=152 bytes. Assume that the number of call arrivals (e.g., Announce message arrivals) per paging zone per paging cycle is modeled as a Poisson-distributed random variable $\tilde{A}$ with a PDF defined as in FIG. 4. Further assume that $K_{max,TWO}$ denotes the maximum number of pages transmitted when exactly two Announce messages are broadcast across a paging zone. Similarly, let $K_{max,ONE}$ denote the maximum number of pages transmitted when exactly one Announce message is broadcast per paging zone per paging cycle. It is also possible that when a large number of calls (>$K_{max,ONE}$+1) arrive at the paging zone, then no Announce message is broadcasted in that paging cycle. Each page message has 9 bytes (i.e., one byte of payload and 8 bytes of headers, such as MAC/SLP/SNP layer headers). Therefore, $K_{max,TWO}$ is (102+50−128)/9=2 pages and $K_{max,ONE}$=(102=50−64)/9=9 pages. With these assumptions, the fraction (percentage) of calls (e.g., QChat calls) that can benefit from Direct DOS delivery is given by Equation 2 as follows:

Fraction of Direct DOS enabled QChat Calls =     Equation 2

$$Pr(\tilde{A} \leq 2) + \sum_{k=3}^{K_{max,TWO}+2} \frac{2}{k} Pr(\tilde{A}=k) + \sum_{k=K_{max,TWO}+3}^{K_{max,ONE}+1} \frac{1}{k} Pr(\tilde{A}=k) = 13.6\%.$$

The fraction expressed by Equation 2 is based particularly on two assumptions; namely that (i) all incoming Announce messages in a 426 msec "period" are buffered at the RAN 120 (i.e., at one or more BSCs 122) and that the RAN 120 floods up to two Announce messages exactly once at the end of the 426 msec "period". Further, the 426 msec "period" defined at the RAN 120 is not necessarily perfectly aligned with the 426 msec Control Channel Cycle at each of its constituent BTSs but may be offset by a fixed amount.

2. Cluster-Based Flooding of Announce Messages

From the perspective of reducing a delay in established a call (e.g., for a PTT session), a large fraction of calls (e.g., for QChat calls, approximately 50%) tend to exploit the Direct DOS flooding approach despite its drawbacks as discussed above. For example, QChat calls can utilize a "Divide-and-Conquer" approach that takes advantage of the commonly expected behavior of QChat Direct calls, namely, that the targets of concurrently incident QChat Direct calls at a paging zone are "uniformly" spread across sectors in the paging zone. If the RAN 120 is aware of the location of the target access terminal with any degree of reliability, then it becomes more efficient to flood the Announce message to a limited number of sectors in which the target is most likely to be present (e.g., in proximity of the target access terminal's last known location or current expected location). The RAN 120 may also flood a higher number of Announce messages at any given time concurrently to different groups of spatially close sectors, or "clusters". As a result, a higher fraction of QChat calls can benefit from a cluster-based Direct DOS approach, as opposed to a global Direct DOS approach that floods all sectors.

Figure 5:
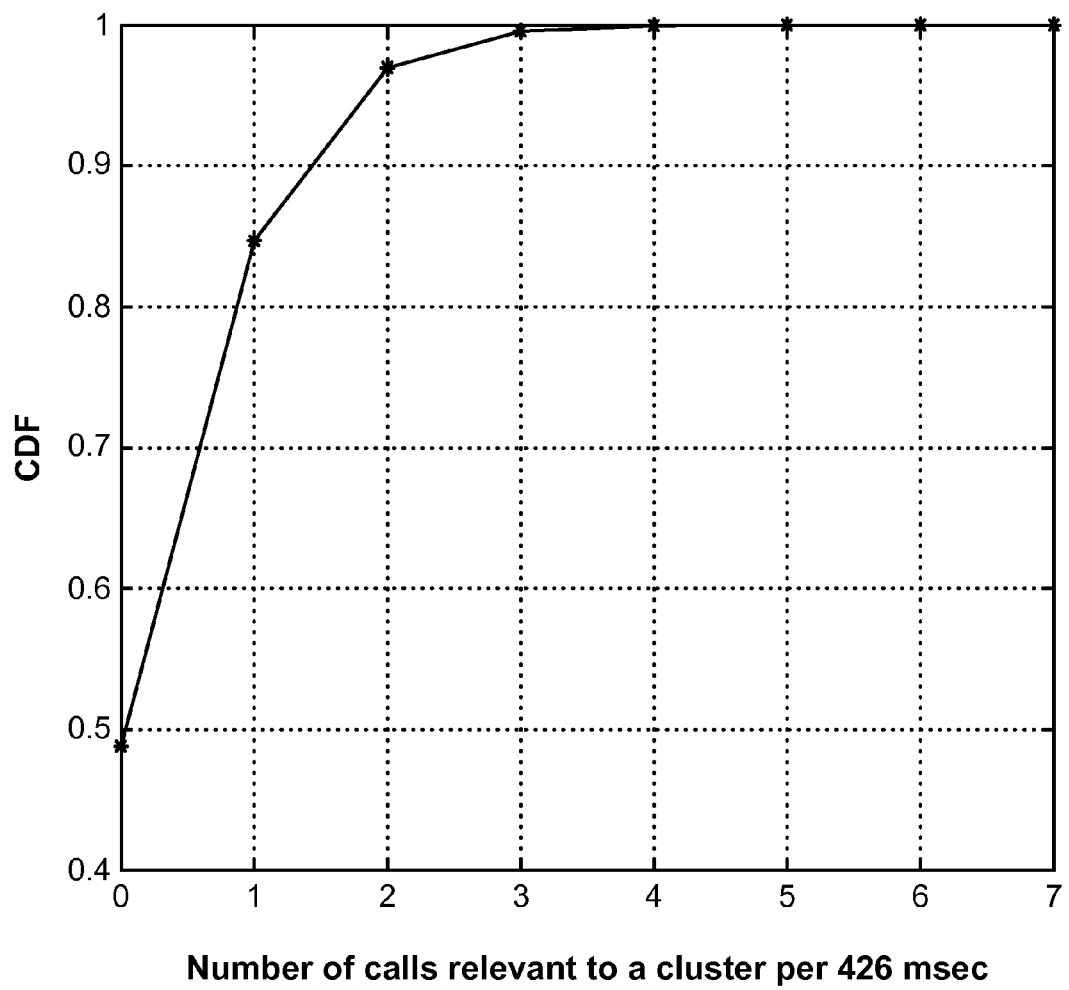
FIG. 5 illustrates a cumulative density function (CDF) of one or more calls out of a total of 15 calls that is destined to a cluster in a 426 msec window according to an embodiment of the present invention.

The following numerical example explains potential benefits of using cluster-based Direct DOS approach for transmitting Announce messages. In the example to be provided next, assume that (i) there are 150 sectors in a paging zone, (ii) a target access terminal for a call is equally likely to be in any sector in a paging zone, (iii) the call arrival rate is 15 calls per paging zone, per paging cycle (i.e., $99^{th}$ percentile value from CDF in FIG. 4) and (iv) the paging zone is divided into groups of sectors ("clusters") and each cluster contains exactly 7 contiguous sectors. With these assumptions, the probability of a call arriving into any given cluster is 7/150. The probability distribution of the number of calls destined for a given cluster is illustrated in FIG. 5. Further, an example of a cluster including 7 contiguous sectors is illustrated in FIG. 6.

FIG. 5 illustrates a CDF of one or more calls out of a total of 15 calls that is destined to a cluster in a 426 msec window. Referring to FIG. 5, the CDF is a Binomial distribution (number of trials=15, probability of success=7/150). The CDF illustrated in FIG. 5 indicates that even for a relatively high call arrival rate (e.g., 15 calls per 426 msec), the probability that three or more calls are destined to a cluster is less than 4%. In other words, at most two calls are destined per cluster per 426 msec, a majority of the time (e.g., ~96%). If the RAN 120 knows the cluster in which each target access terminal for a call is located, then a Direct DOS flooding approach in that particular cluster will guarantee delivery of the Announce message over the control channel, because the control channel has sufficient capacity to transmit 2 DOS messages every paging cycle, as discussed above. Accordingly, the example of FIGS. 5 and 6 indicates that a Direct DOS approach can be achieved a high percentage of QChat calls (e.g., approximately 96%) provided the cluster size is sufficiently small (e.g., 7 sectors).

Figure 6:
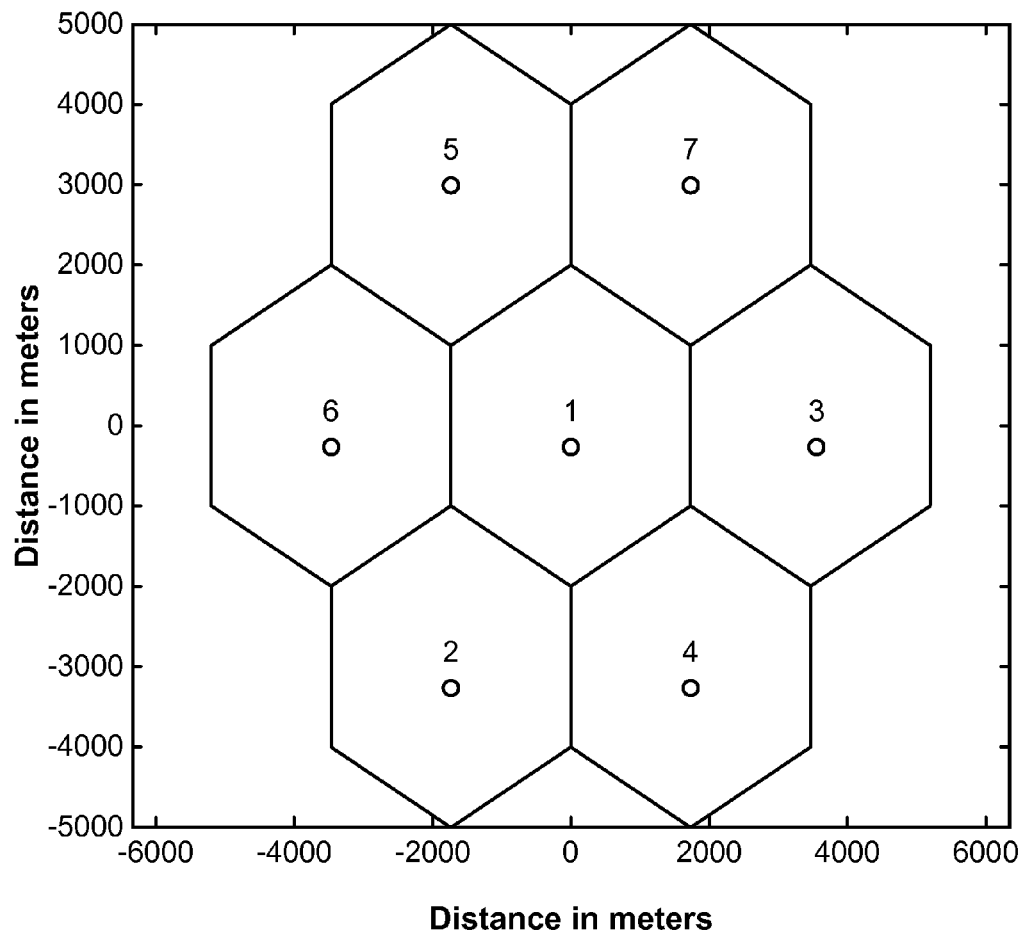
FIG. 6 illustrates a cluster configuration including 7 sectors per cluster according to an embodiment of the present invention.

In the above example given with respect to FIGS. 5 and 6, the size of a cluster (e.g., see FIG. 6) was assumed to be relatively small (i.e., 7 sectors). The effect of increasing cluster size on the ($50^{th}$, $95^{th}$ percentile) rate of arrival of Announce messages into a cluster is illustrated in Table 6 (below). Referring to Table 6, it will be appreciated that as the size of a cluster increases, the number of calls destined to the cluster per paging cycle increases as well. Thus, a smaller fraction of calls will benefit from a cluster-based Direct DOS delivery approach as the cluster size approaches the entire paging zone.

TABLE 6

| Size of Cluster | # of calls arriving into a paging zone per paging cycle (50th percentile) | # of calls arriving into a paging zone per paging cycle (95th percentile) |
| --- | --- | --- |
| 7 sectors | 1 | 2 |
| 7 cells or 21 sectors | 2 | 5 |
| 19 cells or 57 sectors | 6 | 9 |
| 37 cells or 111 sectors | 11 | 13 |

Therefore, as will be appreciated by one of ordinary skill in the art, the cluster size can be reduced if the RAN 120 can keep track of access terminal locations so as to determine a sufficient location estimate of the target access terminal. Thus, the RAN 120 can maintain a database indicating the locations of one or more access terminals. For example, the RAN 120 can update the location of a given access terminal in the database whenever the access terminal crosses a cluster boundary. As an example, in a 1xEVDO Rev. A network, each registered access terminal that is in an idle mode can be configured to transmit a RouteUpdate message (RUP) each time the access terminal crosses a cluster boundary. For a cluster configuration as shown in FIG. 6, this can be achieved by setting a normalized value of the RouteUpdateRadius (e.g., where the RouteUpdateRadius is the geodesic distance between two sectors) on a planar surface to be equal to the radius of the cluster ("ClusterRadius"). For the cluster in FIG. 7, the ClusterRadius is equal to the radius of the cell.

Because the size of a paging zone is small relative to the curvature of planet Earth, a paging zone can be assumed to be substantially flat (i.e. planar). Therefore, the RouteUpdateRadius between sectors in a paging zone can be assumed to be the Euclidean distance between sectors. As will be appreciated by one of ordinary skill in the art, smaller cluster sizes will cause more frequent transmissions of RUP messages, particularly by handsets that are in motion. This will necessarily increase the load on the Access Channel. The impact of cluster size on the frequency of distance-triggered RUP message transmissions is discussed in more detail below. Further, the RUP message reporting protocols and location database maintained at the RAN 120 is discussed in greater detail below with respect to FIG. 24.

Generally, as will be discussed in greater detail below with respect to FIG. 24, the locations of ATs that are configured to receive DOS-announce messages can be tracked in a finer manner as compared to non-DOS-announce capable ATs. By keeping closer track of DOS-announce capable ATs, the confidence level associated with the last known or reported location of the AT increases, which decreases the size of the cluster and thereby reduces the number of sectors that send DOS-announce messages. For example, the RouteUpdate message transmission feature in 1xEV-DO can be used. Regarding the transmission of RouteUpdate messages from ATs, the RAN configures a given radius for one or more ATs, and the ATs will then transmit a RouteUpdate to the RAN after traversing a distance that exceeds the RAN configured threshold or radius for the AT. The RouteUpdateRadiusAdd and RouteUpdateRadiusMultiply can be configured for the AT by the RAN in order to track the AT(s) in a finer manner selectively.

Accordingly, for a paging zone of 150 sectors and 333 registered users per paging zone and the call model defined above, approximately 13% of calls (e.g., QChat Direct calls) may benefit from a universal or global Direct DOS flooding protocol that limits the maximum number of Announce messages flooded every paging cycle to two.

Figure 7:
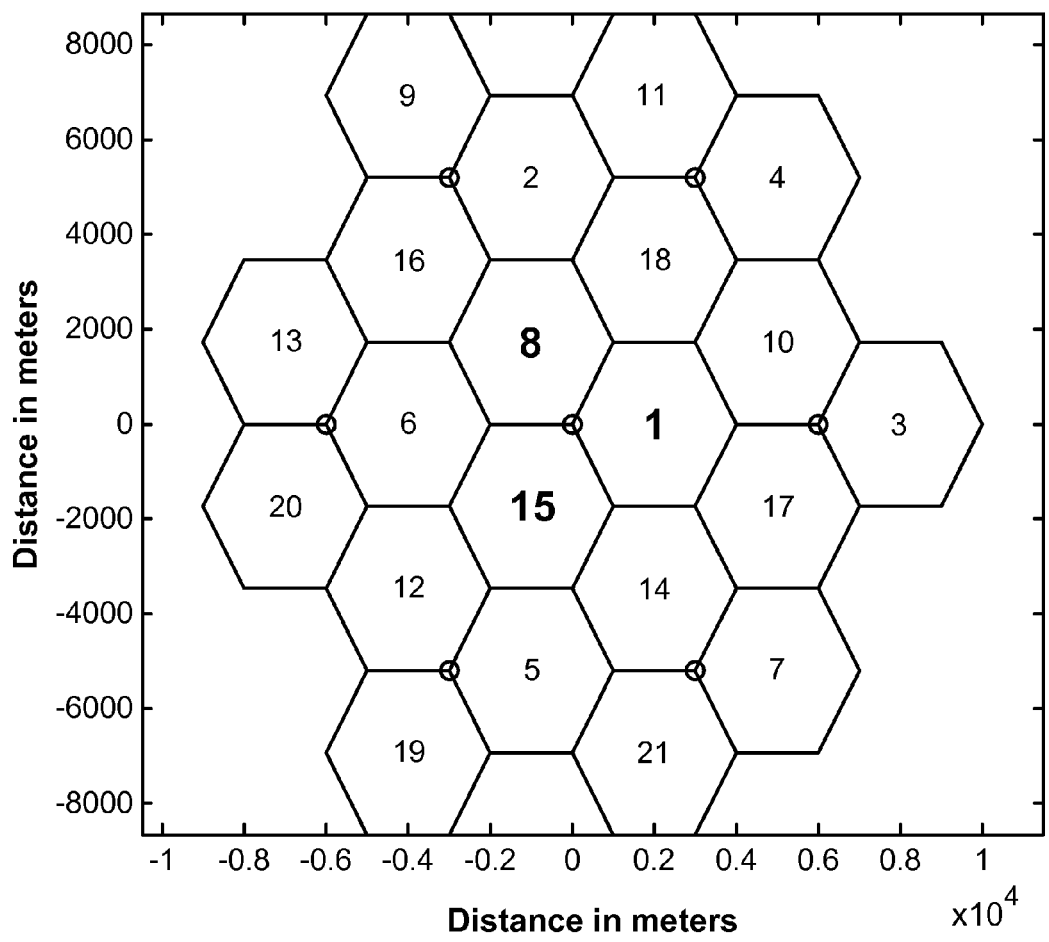
FIG. 7 illustrates a cluster configuration including 7 cells or 21 sectors per cluster according to an embodiment of the present invention.

For a cluster-based Direct DOS flooding protocol, assuming a cluster size of 7 sectors (e.g., shown in FIG. 6), nearly 96% of calls (e.g., PTT or QChat calls) can exploit the more localized Direct DOS approach without significantly impacting to network capacity (e.g., even during a busy-hour). For a larger cluster configuration of 7 cells (i.e., 21 sectors) as shown in FIG. 7, 50% of calls (e.g., PTT or QChat calls) may benefit from the cluster-based Direct DOS approach. Further, the fraction of calls (e.g., PTT or QChat calls) that benefit from a cluster-based Direct DOS flooding approach decreases as the handset population per sector per carrier increases.

Impact of Cluster Size on the Intensity of RUP Transmission

As discussed above, a paging zone of size 150 sectors with 333 registered idle users per sector and a call arrival rate specified by the example call model defined above (i.e., 1.45 calls/user/hour), a cluster size of 7 contiguous sectors achieved a condition where the number of calls destined to a cluster every paging cycle was at most two 95% of the time. Below, the impact of cluster size on the intensity of distance-triggered RUP message transmission will be discussed to explain a cluster size's effect on the load on the Access Channel.

Figure 8:
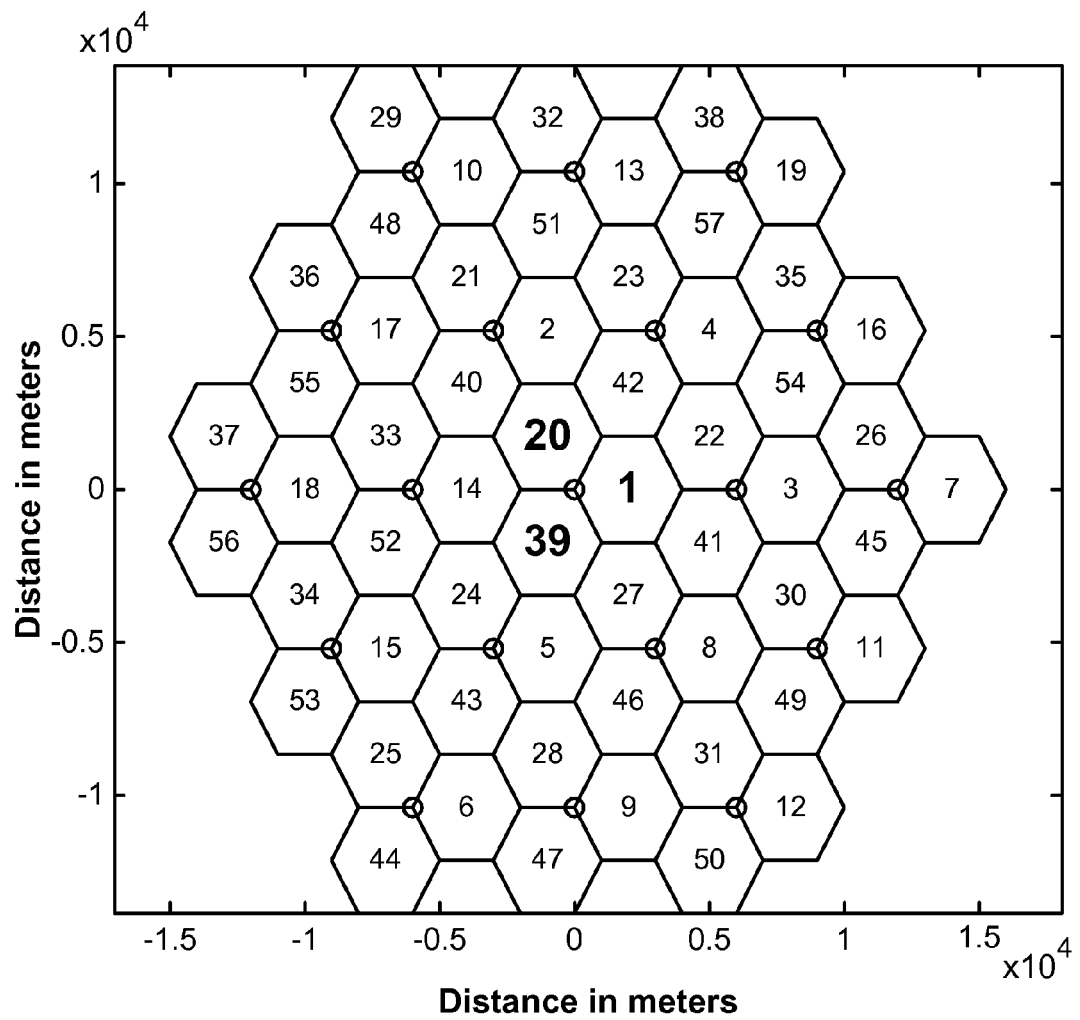
FIG. 8 illustrates a cluster configuration including 19 cells or 57 sectors per cluster according to an embodiment of the present invention.
Figure 9:
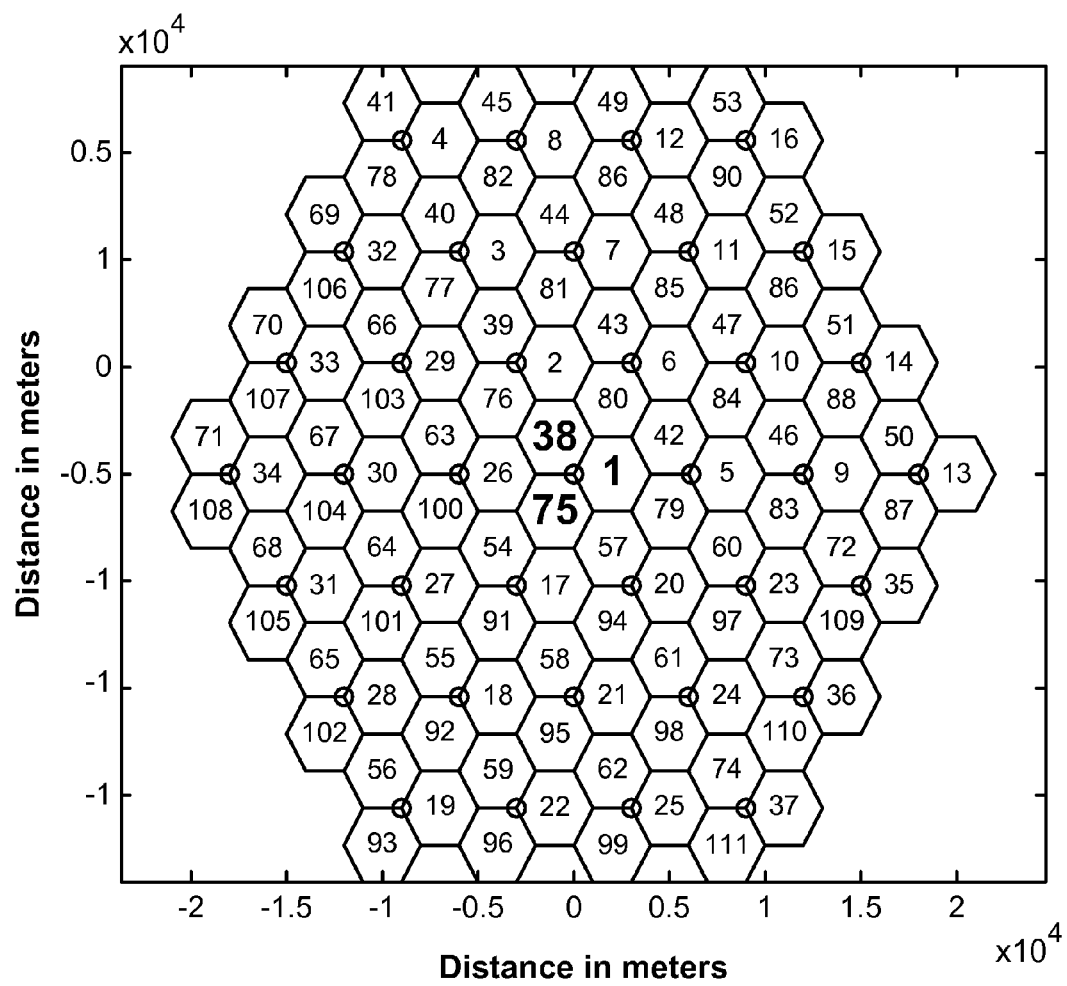
FIG. 9 illustrates a cluster configuration including 37 cells or 111 sectors per cluster according to an embodiment of the present invention.

In particular, three symmetric cluster configurations will be discussed below, respectively comprising 7, 19 and 37 cells, with each cell further comprised of 3 sectors. The layout of these cluster configurations is illustrated in FIGS. 7, 8 and 9, respectively. Denoting the distance between the two nearest cell sites by R (in meters), the cluster radius for the 7-cell, 19-cell and 37-cell cluster configurations are R, 2R and 3R respectively. For these layouts, for convenience of explanation, assume that R=8000 meters. Therefore, the cluster radii for each of the configurations of FIGS. 7, 8 and 9 are 8 km, 16 km and 24 km respectively. For each cluster configuration, setting the RouteUpdateRadius equal to the "radius" of the cluster will trigger a RUP message transmission whenever a handset which last transmitted a RUP message in a cell of a given cluster exits the given cluster.

Figure 10:
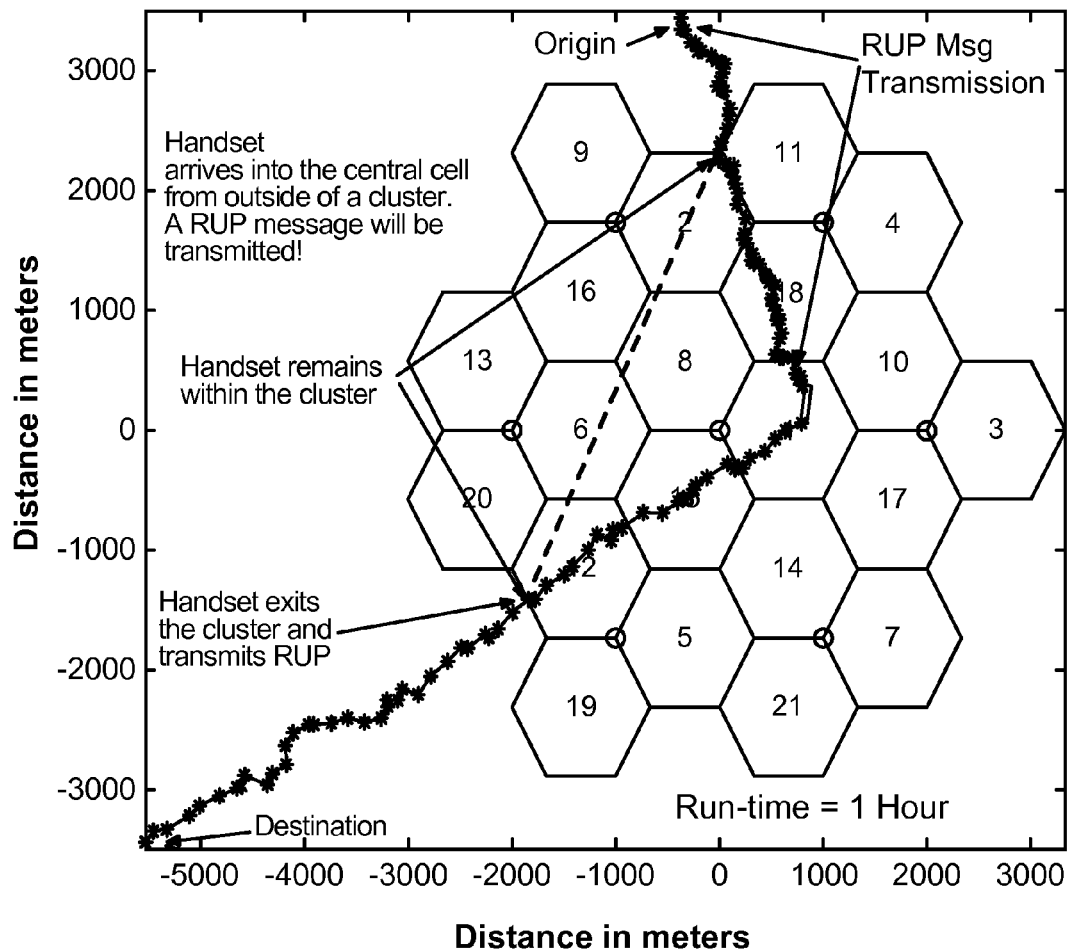
FIG. 10 illustrates a trajectory or path of a handset over a one hour period according to an embodiment of the present invention.

An example of a trajectory or path of a handset over a one hour period is illustrated in FIG. 10. Assuming that the handset transmitted a RUP message at time t=0 at the point of origination, a second RUP message transmitted when the handset arrives in a central or internet cell (i.e., sector #1) and a third RUP message is transmitted when the handset exits the cluster confirmation (i.e., sector #12). As will be appreciated by one of ordinary skill in the art, the rate at which RUP messages is transmitted depends on (i) the underlying mobility model (e.g., the speed at which the mobile station is moving among the cells) as well as the radius of the cluster.

1. Example of Modeling Mobility of Handsets: A Random Gauss-Markov Mobility Model In another example, assume that the inter-cell distance is 2000 meters (i.e. R=2000 m). In other words, the radius of a cell is 1 km. Each cell has 3 sectors which are denoted by hexagons in the FIGS. 7, 8 and 9. Each cell has 1000 registered users uniformly scattered across the 3 sectors, i.e. average of 333 handsets/sector. With these assumptions, a Random Gauss-Markov mobility model is used as a mobility model for purposes of simulation. This model is a fairly generalized mobility model that is suitable for large-scale wireless networks as cellular networks because of its ability to mimic different types of mobility patterns for users by adjusting the mobility parameters. Examples of mobility models that can be modeled by a Random Gauss-Markov mobility model include the random walk model, the random waypoint model as well as the fluid-flow mobility model. In this model, the velocity (speed and direction) of a registered user is assumed to be constant for a fixed amount of time $\Delta T$, and changes once every $\Delta T$ seconds. Assuming that the velocity of the mobile at time instant 't' is $\vec{V}(t)$, the velocity (2-dimensional vector) at time instant 't+$\Delta T$' is given by Equation 3 as follows:

$$\vec{V}(t+\Delta T) = \alpha \vec{V}(t) + (1-\alpha) \vec{V}_{avg} + \sqrt{1-\alpha^2} \vec{X}(t) \qquad \text{Equation 3}$$

where $0 \leq \alpha \leq 1$, $\vec{V}_{avg}$ is the (long-term) mean velocity vector of the mobile and each of the two components of the vector $\vec{V}(t)$ are independent, uncorrelated Gaussian processes with zero mean and a standard deviation a that is equal to the standard deviation of the velocity process. The mobility parameter a is given Equation 4 as follows:

$$\alpha = e^{-\beta \Delta T} \qquad \text{Equation 4}$$

where $\beta$ is a parameter that determines the amount of memory in the mobility pattern.

Figure 12:
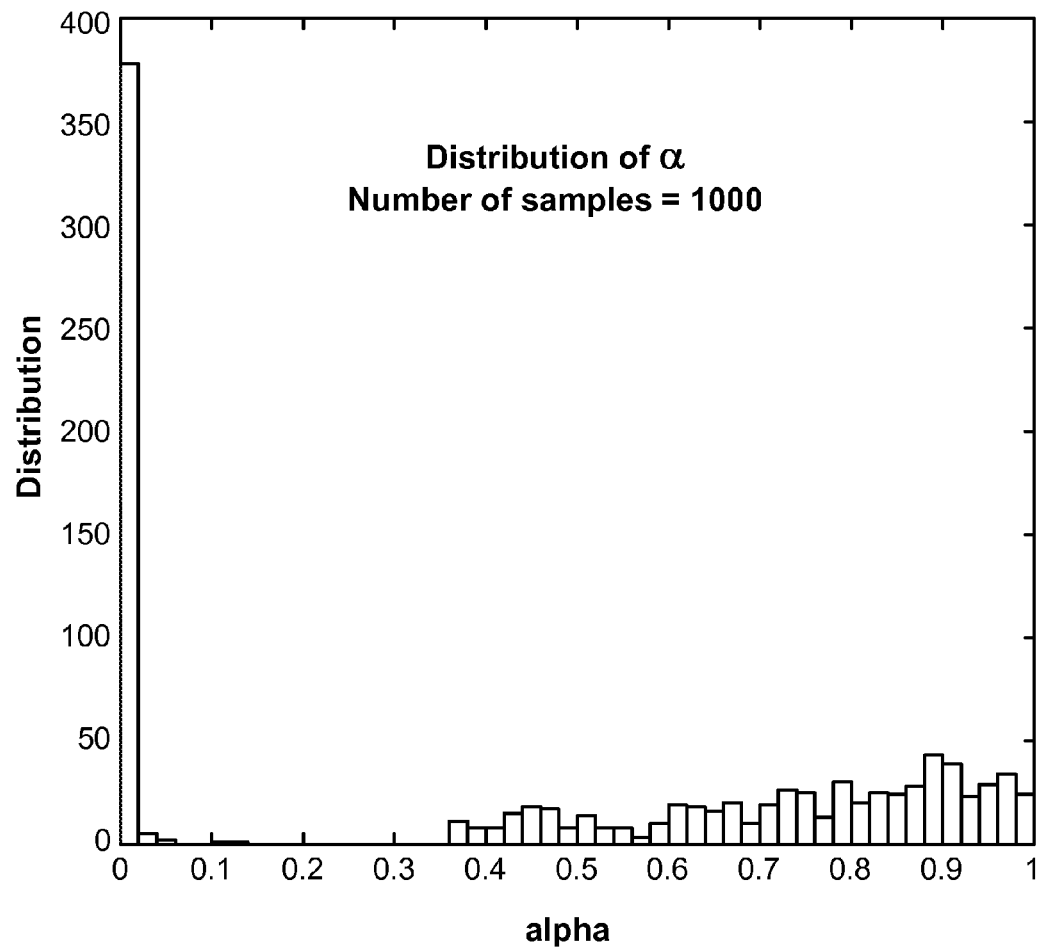
FIG. 12 illustrates the distribution of randomly selected mobility parameters for a handset according to an embodiment of the present invention.
Figure 13:
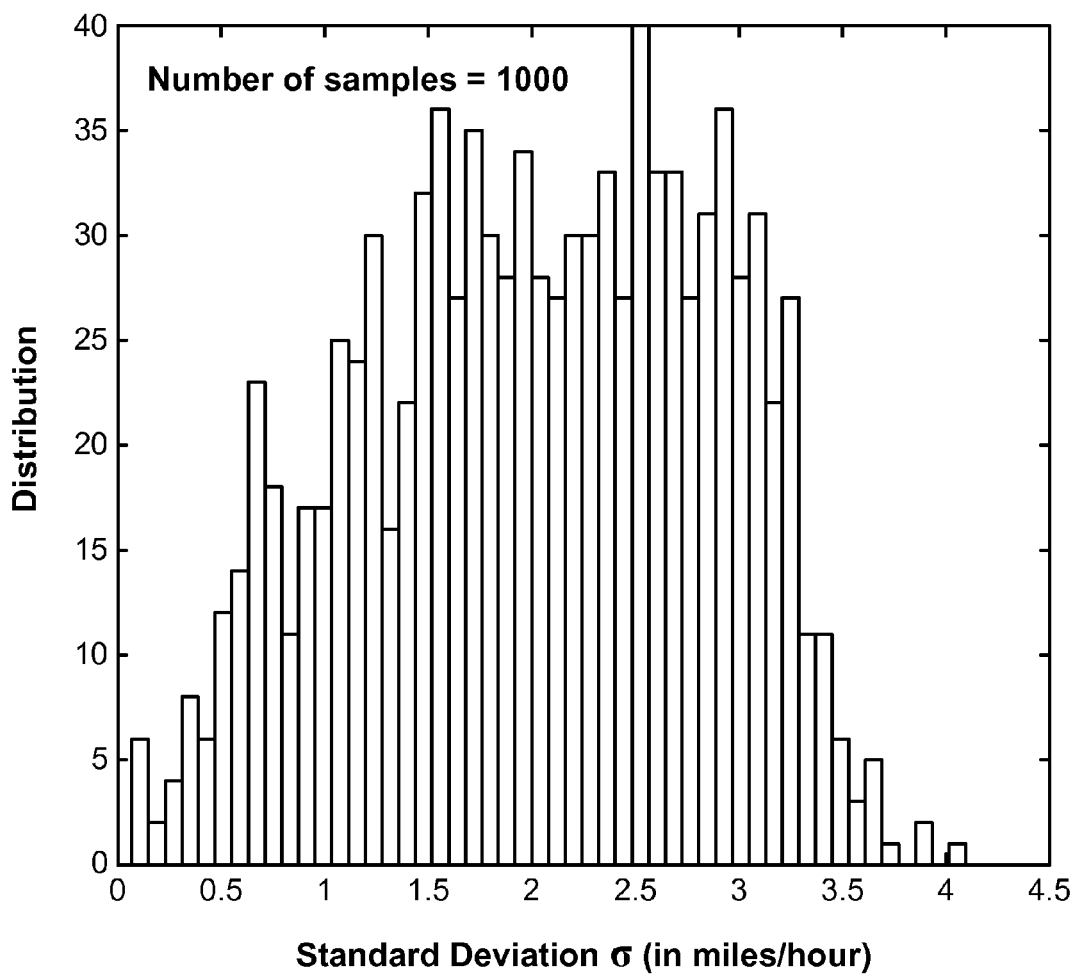
FIG. 13 illustrates the standard deviation of the velocity process defined in the mobility model according to an embodiment of the present invention.

Whenever $\alpha$ is low, handsets move haphazardly (i.e. a random waypoint model). As $\alpha \to 1$, the mobility pattern of the handset approximates a straight line. The mobility parameters for a handset can be specified by the 4-tuple $\{\beta, \vec{V}_{avg},$ ΔT, σ}. For purposes of simulation, assume that (i) the distribution of the mean velocity of a handset ($\vec{V}_{avg}$) is shown in FIG. 11, (ii) the speed and direction of motion of each user is assumed to change every minute, i.e. ΔT=60 seconds, (iii) the parameter a for each handset is randomly chosen from the distribution highlighted in FIG. 12, where the distribution is determined by a suitable adjustment of β, for a given ΔT and that (iv) the standard-deviation σ for each handset is different and determined from the distribution specified in FIG. 13, wherein the standard deviation a of the velocity process defined in the mobility model for each handset is held constant throughout a given simulation.

Figure 11:
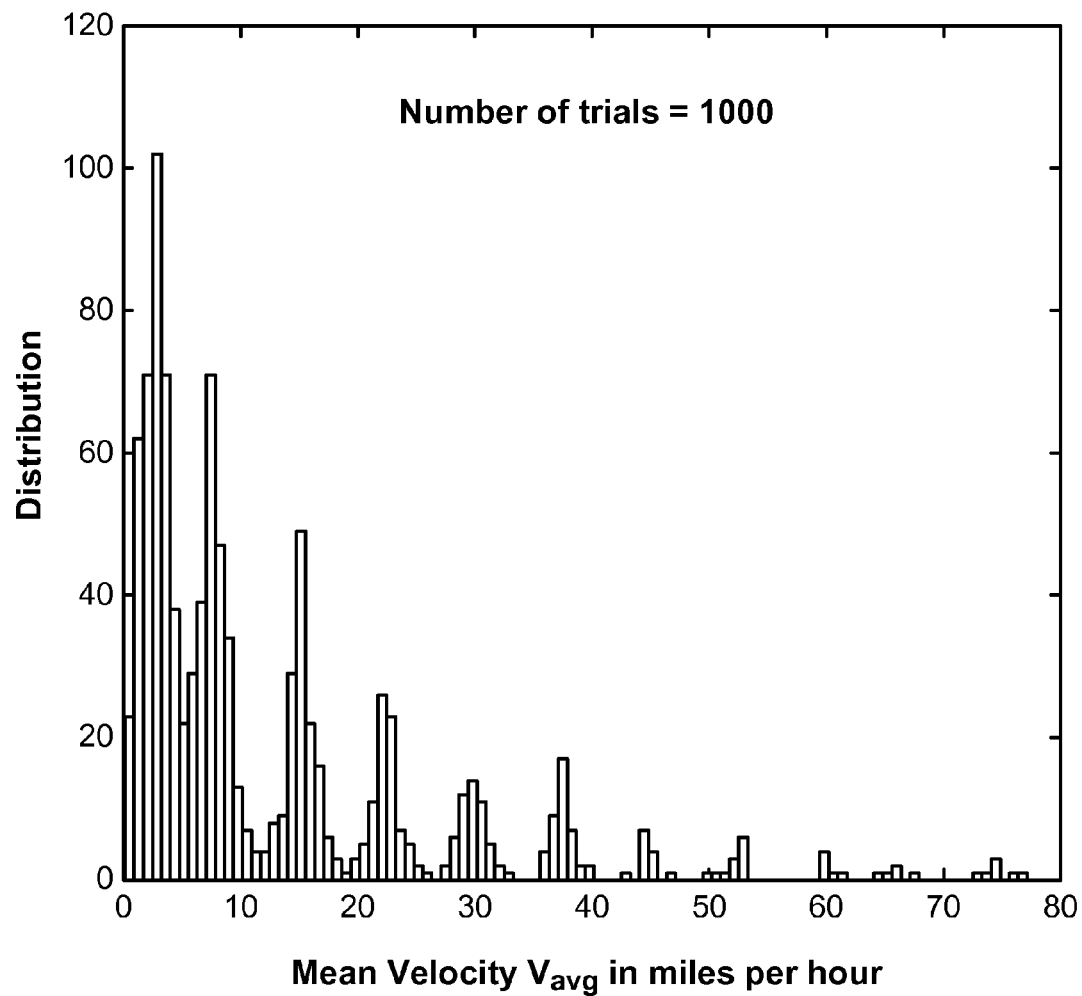
FIG. 11 illustrates the distribution of the mean velocity of a handset according to an embodiment of the present invention.

Referring to FIG. 11, the mean velocity distribution indicates that a large number of handsets in a sector have low average speeds over a one hour period, and a small fraction of handsets move at very high average speeds (e.g., upwards of 50). Further, even though a mobile may have a low mean speed over a 1 hour period, its instantaneous speeds can be significantly higher albeit for a small fraction of time.

Figure 14:
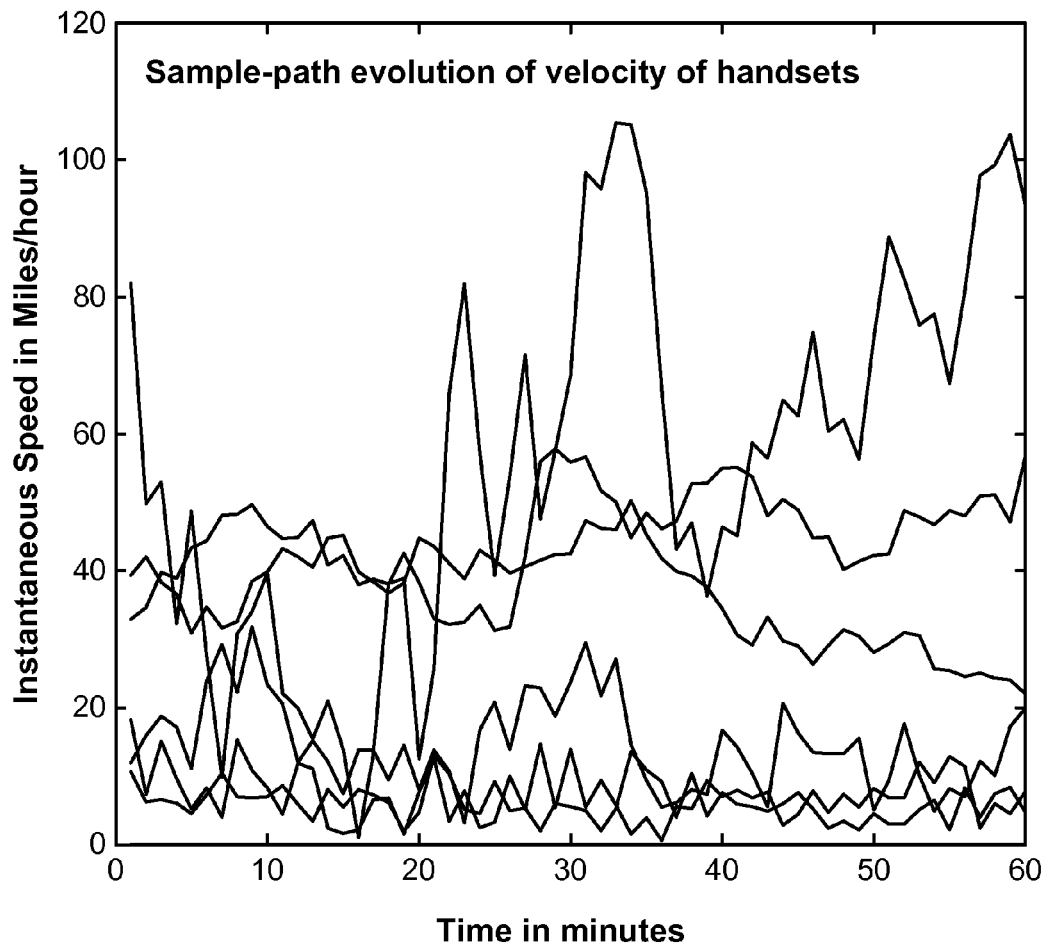
FIG. 14 illustrates a path evolution of the velocity of a collection of 10 handsets according to an embodiment of the present invention.

2. Determining the Probability Distribution of the Inter-Transmission Time of Distance Triggered RUP Messages As will be appreciated by one of ordinary skill in the art, the frequency of RUP messages depends on the parameters associated with the mobility model. In this section, the probability distribution of the inter-transmission time of RUP messages by a handset is determined via simulations. At time t=0, a large number of handsets (e.g., 1000) are randomly scattered in the central cell in each cluster configuration. Each handset randomly chooses its mobility parameters, as discussed above. Assume that the velocity of each handset changes once every minute and the simulation is run for a period of 60 minutes. An example path evolution of the velocity of a collection of 10 handsets is illustrated in FIG. 14. A review of FIG. 14 indicates that the speed of movement of a handset exhibits both high degrees of correlation over time as well as frequent fluctuations in magnitude throughout the time span of the simulation run.

Figure 15:
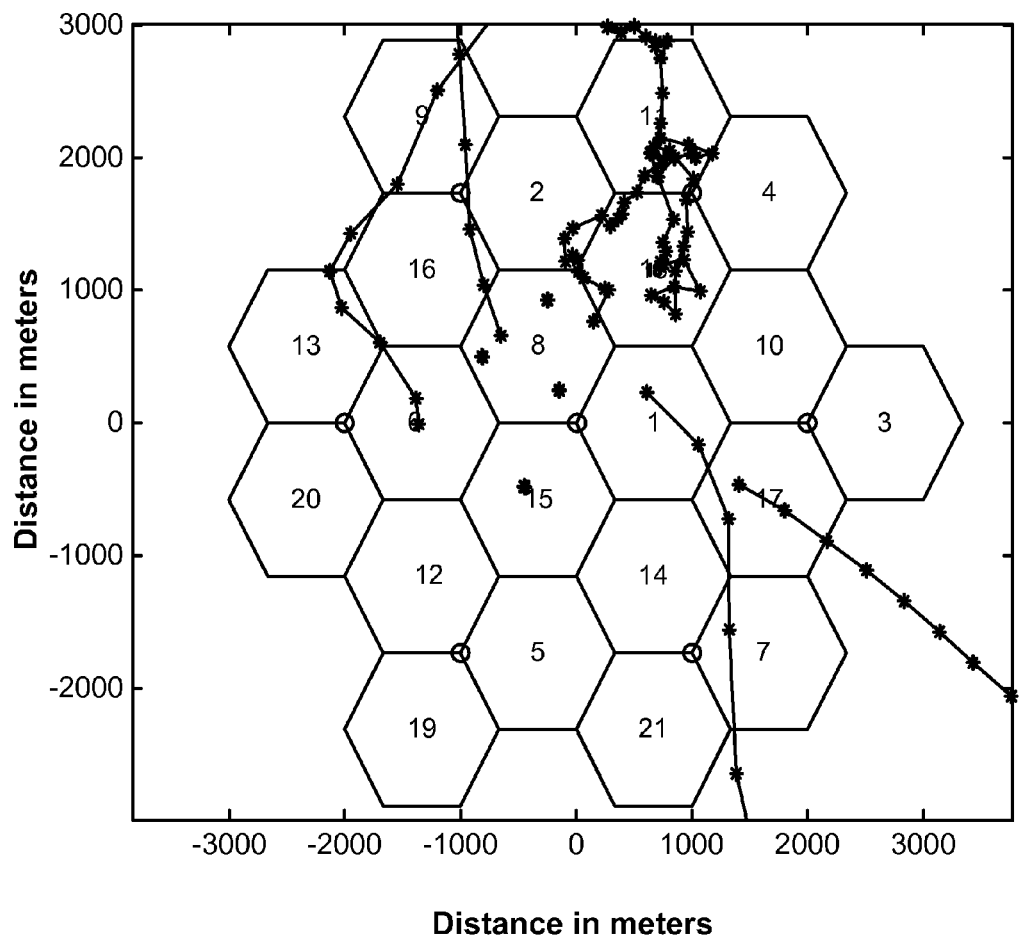
FIG. 15 illustrates a variety of mobility patterns followed by handsets according to an embodiment of the present invention.

The trajectory followed by a set of 10 handsets (unrelated to those illustrated in FIG. 14) is illustrated in FIG. 15. FIG. 15 illustrates a variety of mobility patterns followed by handsets over the course of the simulation run. In FIG. 15, certain handsets follow a relatively linear path, others follow a "zig-zag" pattern and yet others are relatively stationary. It will be appreciated that handsets that move at high speeds and in a relatively straight line will naturally cross the cluster boundary in a short period of time. On the other hand, handsets that are more or less stationary or moving randomly will tend to remain within the frontiers of a cluster for longer durations of time. In a simulation with the above assumptions, out of a total of 1000 registered handsets that are associated with the central cell at time t=0, only 21.9% of the handsets remain within the confines of a 7-cell cluster, 32.6% remain within a 19-cell cluster and 38.3% remain within a 37-cell cluster. This means that 78.1% of the handsets will exit a 7-cell cluster boundary, 67.4% will exit a 19-cell cluster boundary and 61.7% exit a 37-cell cluster boundary.

Figure 16:
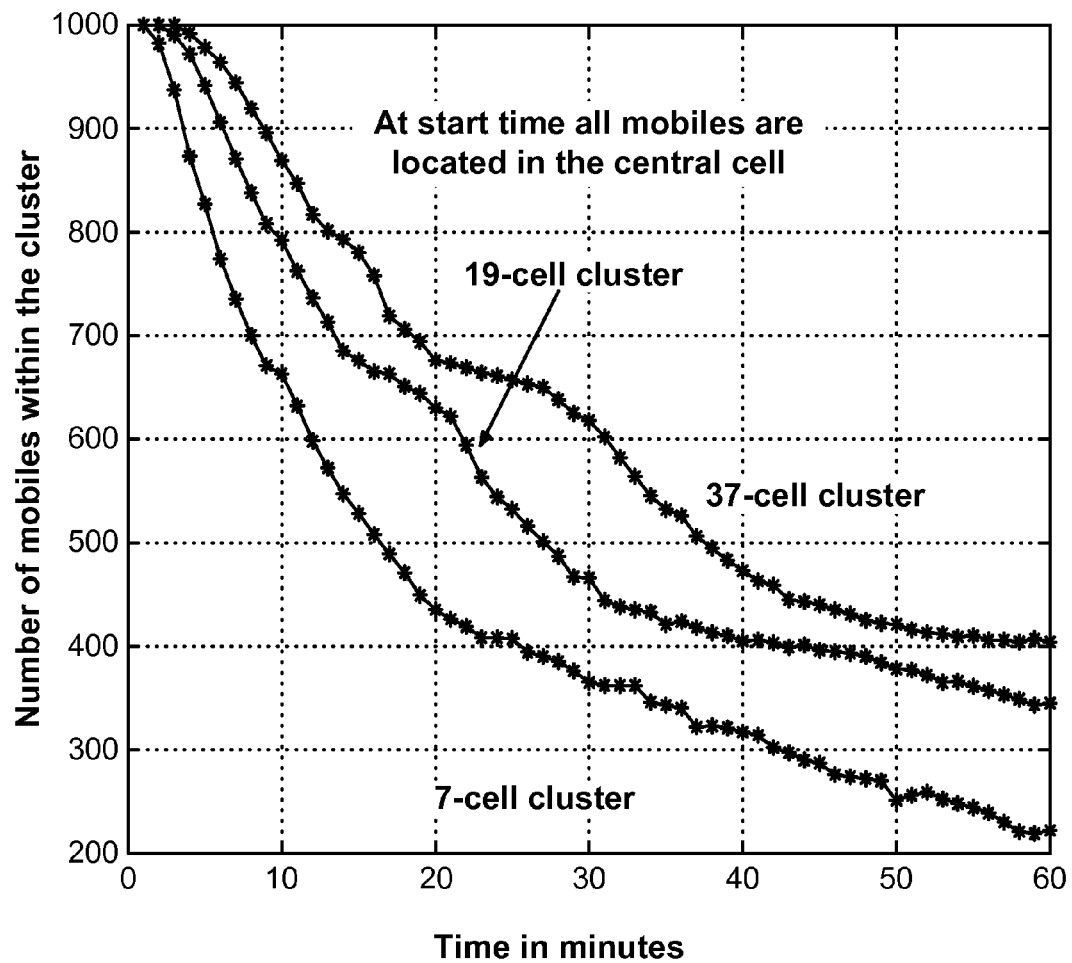
FIG. 16 illustrates the decrease in the total number of handsets in a cluster over time according to an embodiment of the present invention.

FIG. 16 illustrates the decrease in the total number of handsets in a cluster over time given that these handsets were located in the central cell of the cluster initially (i.e., at time t=1 minute). A review of FIG. 16 indicates that handsets that move at high speeds exit the cluster relatively quickly and cause a sharp decrease in the number of handsets per cluster initially. This curve flattens (marginally diminishing) with increasing time since only slow moving handsets remain within the cluster boundary, and these slow-moving handsets take a relatively long time to move out of the cluster. At the end of one hour (t=60 minutes), the curves in FIG. 16 saturate nearly completely in the range 220~390 handsets depending on the size of the cluster. This is due to the fact that a certain fraction of the handsets are almost stationary and never leave the boundaries of the cluster.

Denoting the total number of handsets that are located within the cluster at time 't' by N(t), the probability of a handset exiting a cluster in a period of 't' minutes denoted by F(t) can be given by Equation 5 as follows:

$$F(t) = 1 - \frac{N(t)}{N(0)} = 1 - \frac{N(t)}{1000}. \qquad \text{Equation 5}$$

Figure 17:
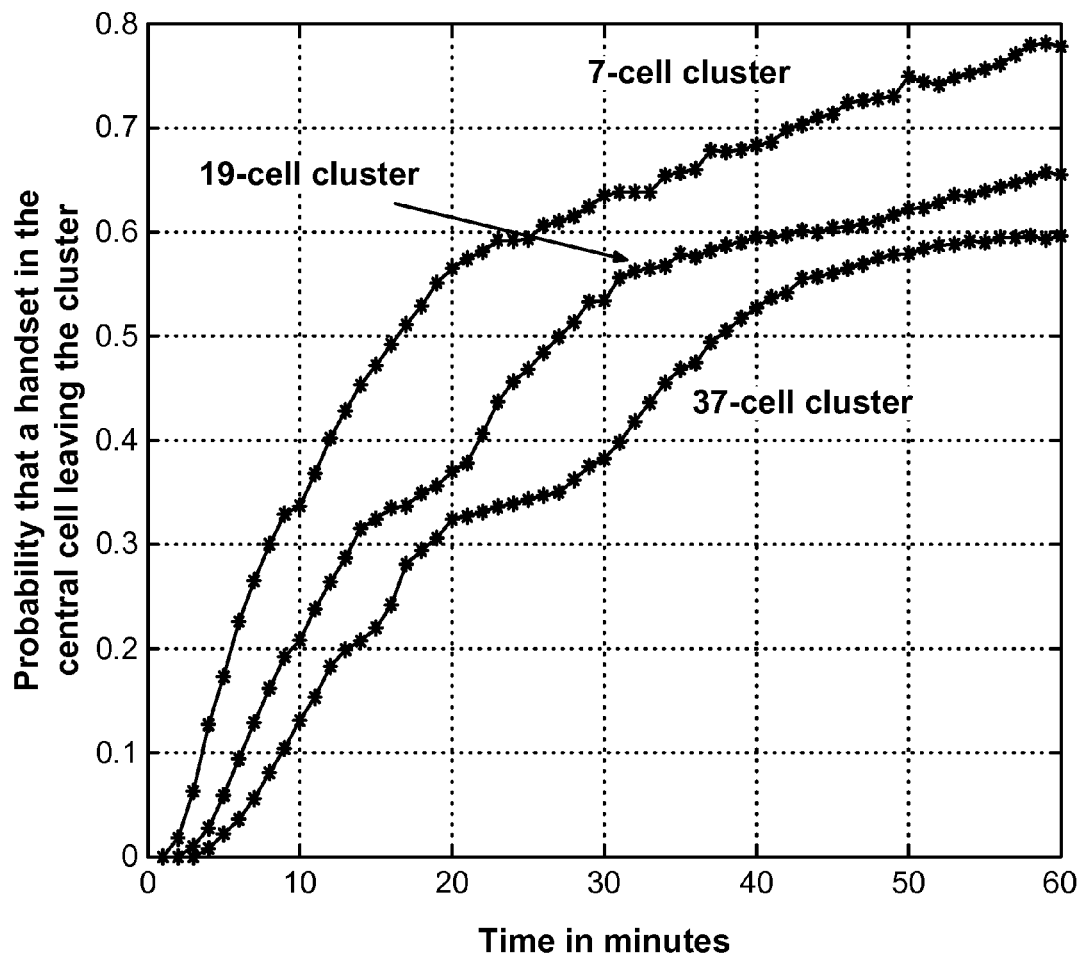
FIG. 17 illustrates the probability that a handset in a cluster leaves the cluster over time according to an embodiment of the present invention.
Figure 18:
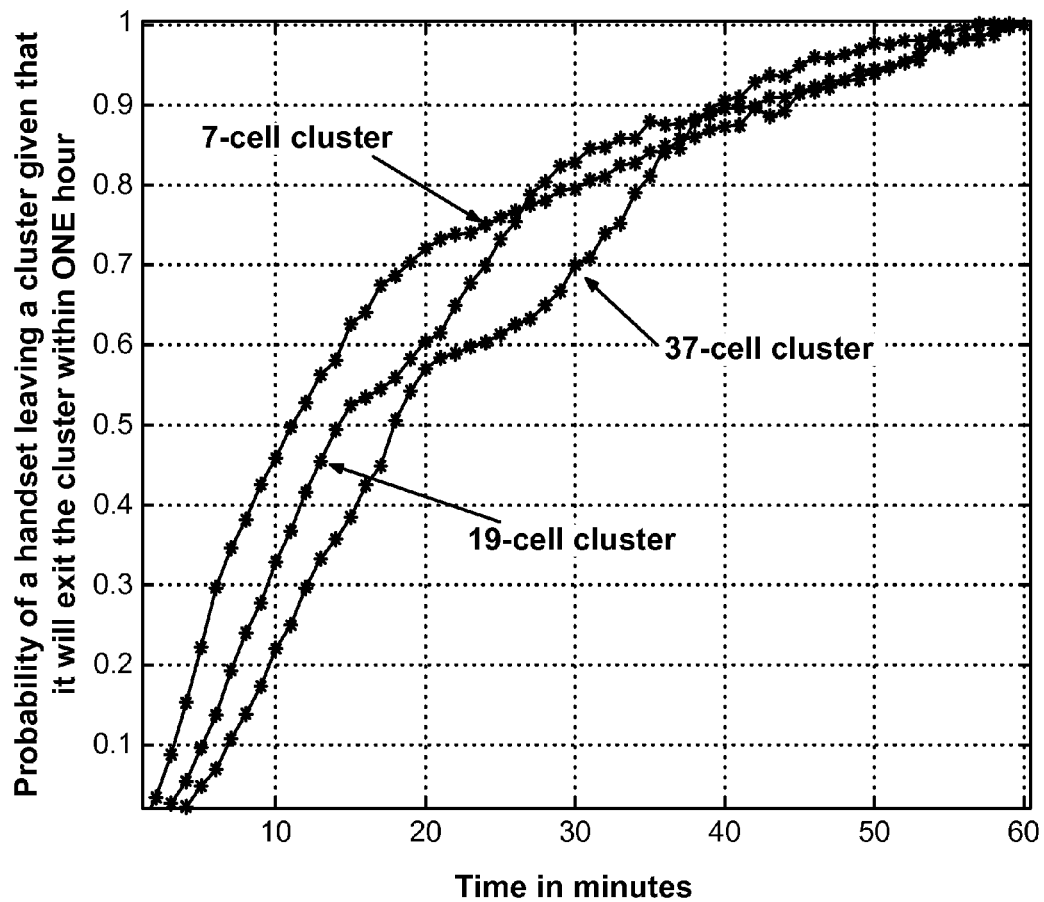
FIG. 18 illustrates the probability of a handset leaving a cluster minute per minute given that the handset will leave the cluster within an hour for different cluster configurations according to an embodiment of the present invention.

The CDF F(t) of the simulation is illustrated in FIG. 17 as a function of t. After a period of an hour, some handsets remain within the cluster. Let the fraction of handsets that remain within the confines of the cluster after one hour be denoted by q, where q is equal to 0.22, 0.33 and 0.39 for 7-cell, 19-cell and 37-cell clusters respectively. With these assumptions, the probability distribution of a handset departing a cluster at by time T, where 0≦T≦60, given that it is known to depart the cluster within one hour is equal to F(T)/(1−q). The PDF F(T)/(1−q) is illustrated in FIG. 18 for various cluster configurations.

Figure 19:
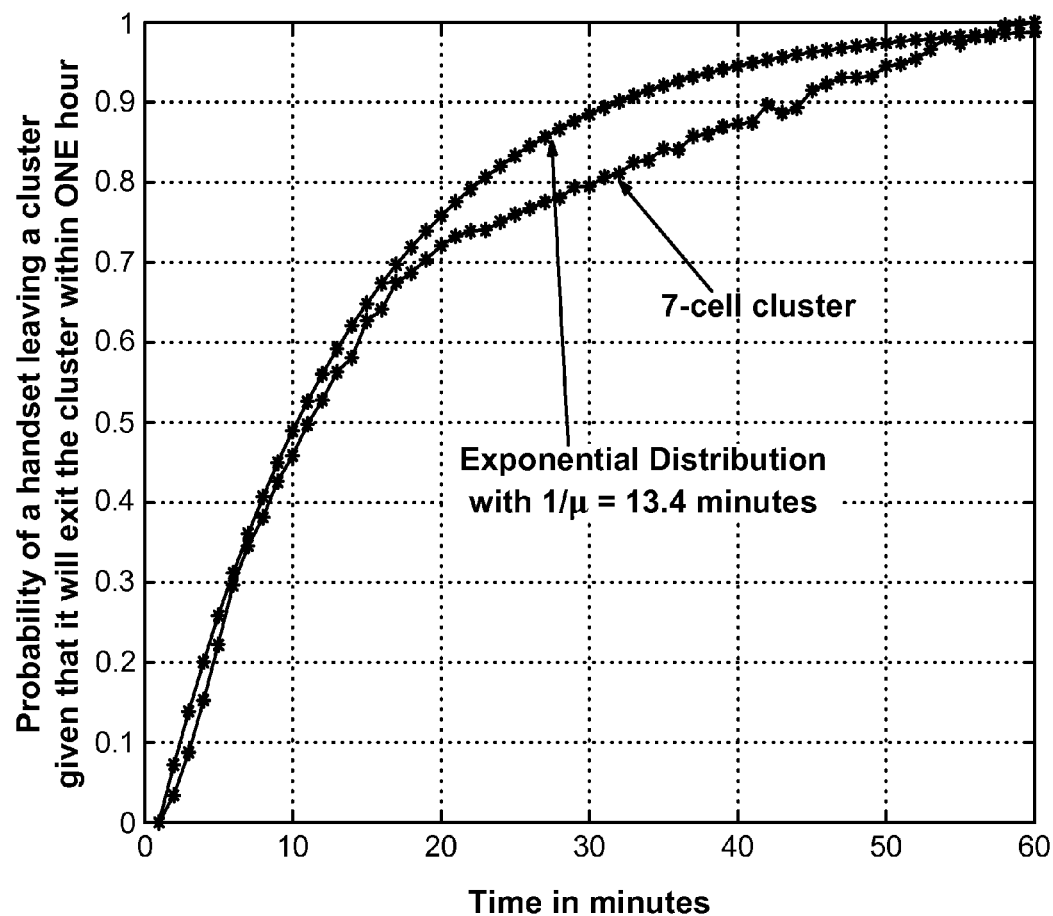
FIG. 19 illustrates an exponential distribution of a probability of a handset leaving a cluster minute per minute given that the handset will leave the cluster within an hour for a 7-cell cluster configuration according to an embodiment of the present invention.
Figure 20:
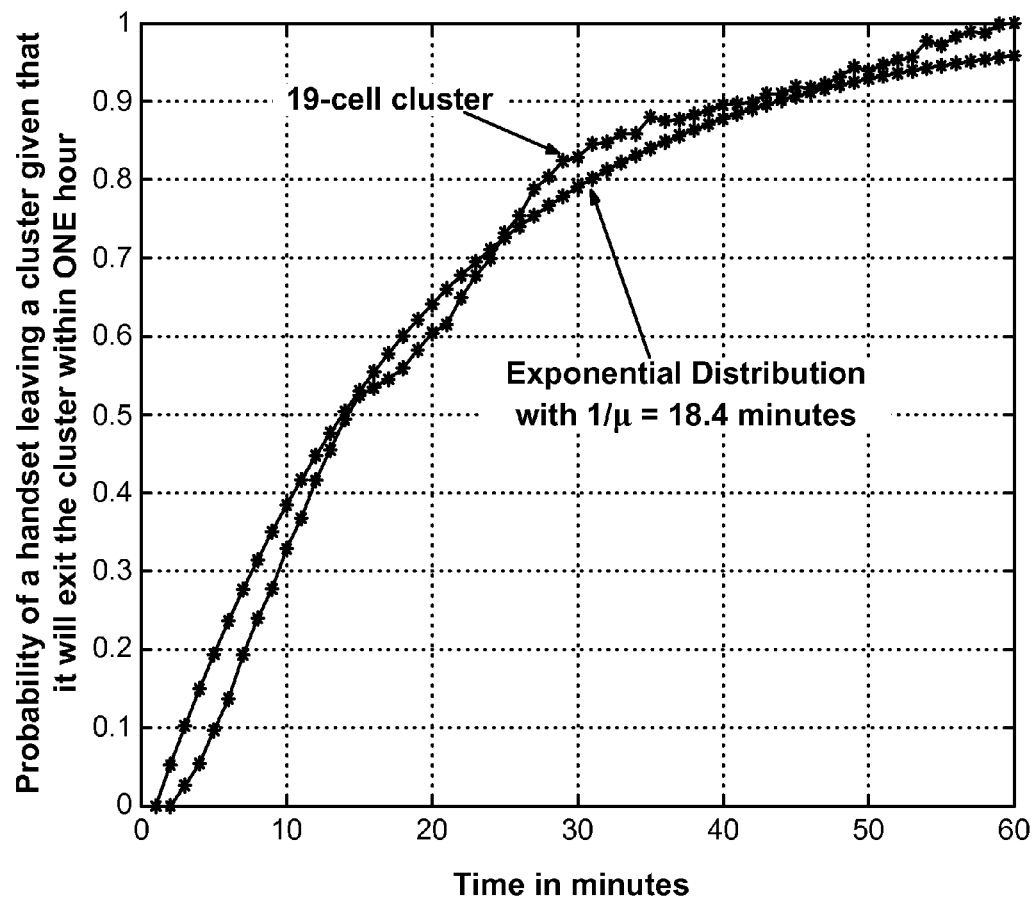
FIG. 20 illustrates an exponential distribution of a probability of a handset leaving a cluster minute per minute given that the handset will leave the cluster within an hour for a 19-cell cluster configuration according to an embodiment of the present invention.

The PDF F(T)/(1−q) can be approximated by an exponential distribution as shown in FIGS. 19 and 20 for a 7-cell and 19-cell cluster configuration, respectively. A benefit of approximating the PDF F(T)/(1−q) using an exponential distribution is that it facilitates system-wide analysis using a queuing-theoretic framework to determine the rate of distance-triggered RUP transmission, thereby reducing the scalability issue associated with running a simulation with 50,000 handsets moving within a paging zone over a long period of time. Additionally, because of the tightness of this approximation, the relative errors between simulations and analytically derived results are kept relatively low.

Assuming that the amount of time a handset dwells within a cluster is modeled by an exponential distribution, the departure of handsets from a cluster will be Poisson distributed. This occurs because departures from one cluster are arrivals into another cluster. Therefore, the inter-arrival time between two arrivals into a cluster from another cluster is exponentially distributed, and the arrival process into a cluster from another cluster is a Poisson process. Additionally, the superposition of arrival processes (that are Poisson distributed) from different clusters into a given cluster is also a Poisson process. Therefore, the cumulative arrival process into a cluster is a Poisson process and can be analyzed as a queuing system, as will be discussed below.

3. Determining the Distribution of the Inter-Transmission Time of RUP Messages Using Queuing-Theoretic Analysis Consider the set of handsets that transmitted a RUP message to one of the central sectors in FIGS. 7, 8 and 9. Following the RUP message transmission, the average dwell-time of a fraction (1−q) of handsets within the cluster boundary is given by an exponential distribution as shown in FIGS. 19 and 20. Following this duration, these handsets will transmit another RUP message to a sector outside of the cluster configuration. For the remaining handsets that do not exit the cluster after a period of an hour, it is assumed that the mobility parameters (mean velocity and variance) are updated based on a random selection from the associated distributions in FIGS. 11, 12 and 13 at the end of an hour and remains the same for the following hour.

Figure 21:
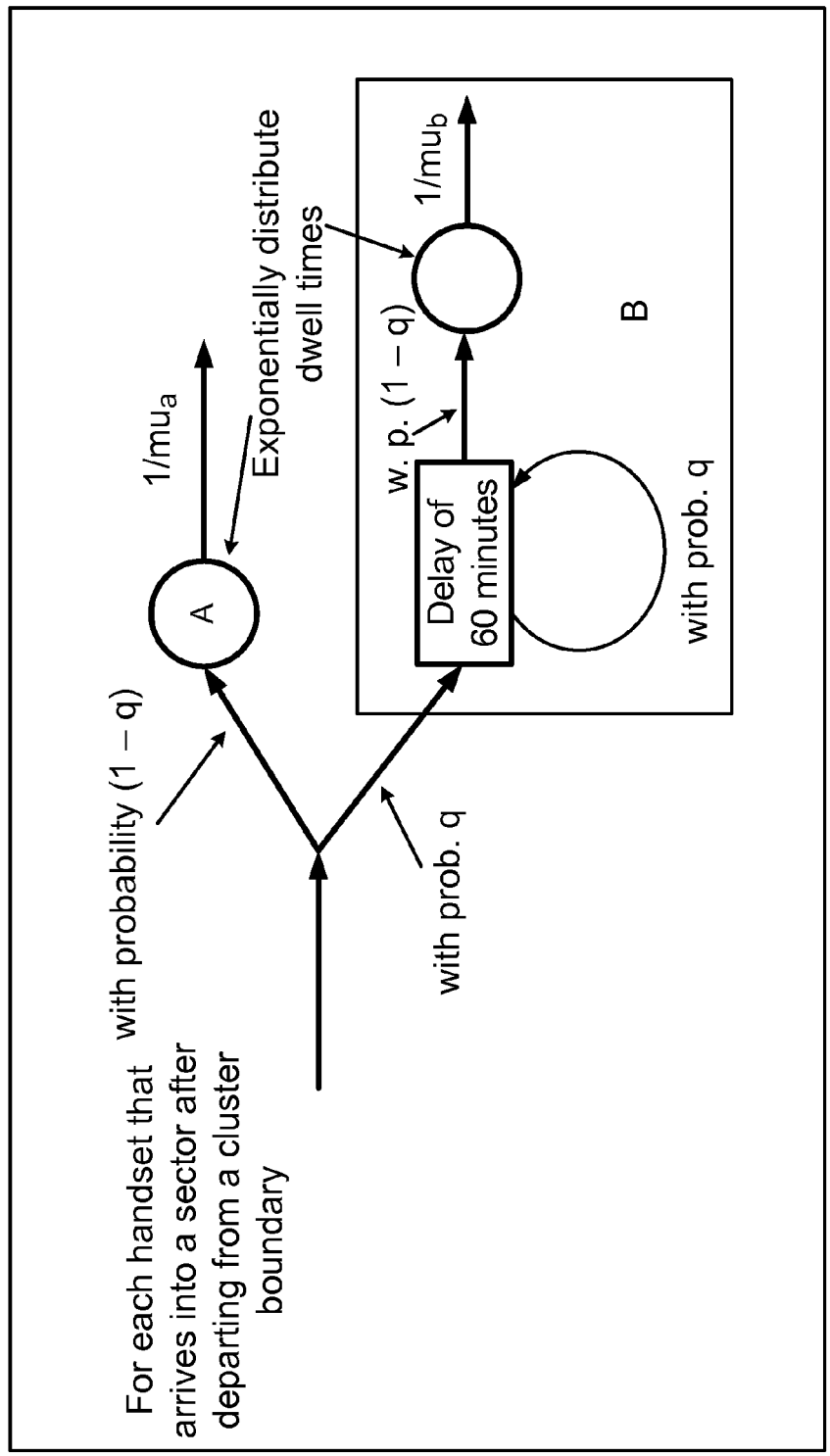
FIG. 21 illustrates a queuing system to analyze route update (RUP) message transmission rates according to an embodiment of the present invention.

FIG. 21 illustrates a queuing system to analyze RUP transmission rates according to an embodiment of the present invention. Referring to FIG. 21, a server A processes handsets and is guaranteed to dispatch them within an hour. Specifically, the amount of time a handset spends in server A is modeled by an exponential distribution with a mean service time of $1/\mu_a$. For a 7-cell cluster it was established above in FIG. 19 that setting $1/\mu_a=13.4$ minutes approximates the actual dwell-time distribution based on simulation results. For a 19-cell cluster $1/\mu_a=18.4$ minutes. The service process of server B is modeled as a tandem of two servers; namely, a deterministic server that delays all arrivals by one hour and an exponentially distributed service process with mean $1/\mu_b$, where $1/\mu_b \leq 1/\mu_a$. The average dwell-time in a cluster is given by $T_{avg}$ as expressed in Equation 6 as follows:

$$T_{avg} = \frac{1-q}{\mu_a} + \sum_{k=1}^{K} q^k \left( k*60 + \frac{1}{\mu_b} \right), \quad \text{Equation 6}$$

where K denotes the time duration in hours that a handset is likely to dwell within a cluster boundary.

Further assume the average number of handsets registered in a central cell is denoted by $N_{avg}$. The average rate at which handsets present in the central cell leave the cluster can be computed using $N_{avg}/T_{avg}$. In steady-state, the rate of departure of handsets from the central cell to any sector that lies outside the cluster configuration is equal to the rate of arrival of handsets from outside sectors into the central cell. Therefore, the arrival rate of handsets into the central cell from outside of a cluster is simply $N_{avg}/T_{avg}$. The arrival rate of handsets from outside of the cluster into a central sector is $N_{avg}/(3*T_{avg})$. Therefore, the average rate of RUP transmission in a sector can be by $N_{avg}/(3*T_{avg})$. In an example, assume $N_{avg}=1000$. Assuming $\mu_b=\mu_a$, the average arrival rate of handsets into a central sector from outside of a 7-cell cluster denoted by $\lambda$ can be upper-bounded as Equation 7 as follows:

$$\lambda \leq \frac{N_{avg}}{3\left(\frac{1-q}{\mu_a} + q\left(60 + \frac{1}{\mu_b}\right)\right)} \quad \text{Equation 7}$$

$$= \frac{333.34}{0.78*13.4 + 0.22*(60+13.4)}$$

$$= 12.51 \text{ handsets/minute}$$

Similarly, using the equations and assumptions above, for a 19-cell cluster $\lambda \leq 8.72$ handsets/minute and for a 37-cell cluster $\lambda \leq 7.02$ handsets/minute. Assuming that the arrival of a handset into a sector from another cluster triggers exactly one RUP message, the rate of RUP message transmissions is shown in Table 7 (below) for different cluster configurations.

TABLE 7

| Size of Cluster | Surface Area Covered by Cluster | Average Rate of RUP probe transmission per sector per second upon crossing cluster boundary |
|---|---|---|
| 7 cells | 19.8 sq-km | 12.51/60 = 0.21 |
| 19 cells | 53.8 sq-km | 8.72/60 = 0.15 |
| 37 cells | 104.8 sq-km | 7.02/60 = 0.12 |

Under peak loading conditions, there can be up to 1000 registered users/sector/carrier. In this case, the rate of RUP transmissions is approximately three times as much (e.g., 3*0.21=0.63 RUP/second for a 7-cell cluster size). If the average number of transmissions required to transmit an access probe successfully is $(1+\delta)$ where $\delta>0$, then the average rate of RUP transmissions will increase by a factor of $1+\delta$ (e.g., $\delta \leq 0.06$). The transmission of distance-triggered RUP messages in a cell is Poisson distributed with rate $\lambda$. For a 7-cell cluster configuration with a mean rate of 12.51 RUP messages/minute, the PDF of the rate of RUP messages is illustrated in FIG. 22.

Figure 22:
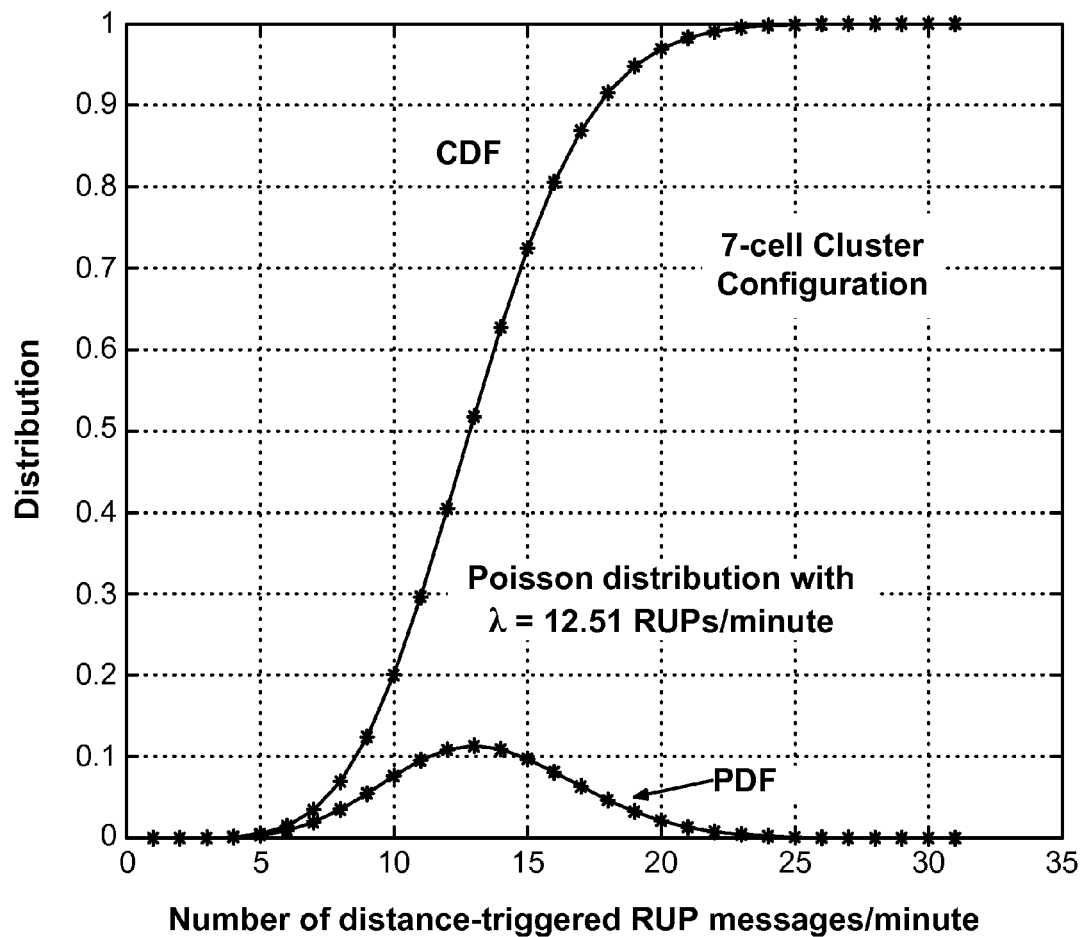
FIG. 22 illustrates a distribution of the transmission rate of RUP messages for a 7-cell cluster configuration with a mean rate of 12.51 RUP messages/minute according to an embodiment of the present invention.

Referring to the CDF of FIG. 22, the instantaneous rate of distance-triggered RUP transmissions in a sector can be as high as 18 RUPs/minute even though the mean rate is 12.5 RUPs/minute for a 7-cell cluster configuration.

4. Net Rate of RouteUpdate/Access Probe Transmissions

As discussed above, RUP messages are transmitted primarily when a handset crosses a cluster boundary. The rate of RUP transmissions for different cluster sizes under nominal loading conditions is listed in Table 6 (above). Further, RUP messages are transmitted when a handset is either an originator or a target of a call. For example, the number of RUP messages received in a sector purely as a result of originating/destined calls can be 0.37 RUP messages per second. Therefore, the net rate of RUP transmissions over the Access Channel is simply the sum of the two rates, since these events are independent of each other. For a 7-cell cluster, the rate of access probe transmission is equal to 0.21+0.37=0.58 probes/second/sector. For $\sigma=0.1$, the average rate of access probes transmitted in a sector is 0.58*1.1=0.64 probes/second/sector. Under very high loads (i.e. 1000 users/sector/carrier in a paging zone), the rate of access probe transmission is approximately three times, i.e., 3*0.58*1.1=1.92 probes/second. Further, the rate of RUP transmissions is strongly dependent on distributions of the mobility parameters $[\vec{V}_{avg}, \alpha, \sigma]$ as well as the actual topology of the cellular network.

Net Rate of RouteUpdate/Access Probe Transmissions

With regard to the simulation described above, in summation, for a cluster configuration of 7-cells, the average rate of RUP transmissions=12.5 RUPs/minute. The $95^{th}$ percentile rate is approximately 18 RUPs/minute. Assuming a paging zone has 37 cells, the average rate of distance-triggered RUP transmissions is 7.02 RUPs/second. Therefore, the additional load on the Access Channel due to a smaller cluster size is 12.51−7.02=5.49 RUPs/minute. Under peak loading conditions with 1000 registered users per sector the average rate of RUP message for a 7-cell cluster increases by a factor of three, i.e. 37.56 RUPs/minute. The total load on the Access Channel due to distance triggered as well as call-triggered probe transmissions is 38.4 probes/minute. Under peak network population, the load can be as high as 115 probes/minute.

Example Implementations of Cluster-Based Direct DOS Flooding

The concepts and simulations described above illustrate that cluster-based direct DOS flooding is feasible in real-world scenarios. Example implementations of cluster-based direct DOS flooding will now be described to help further explain the concepts described above in detail.

Figure 23:
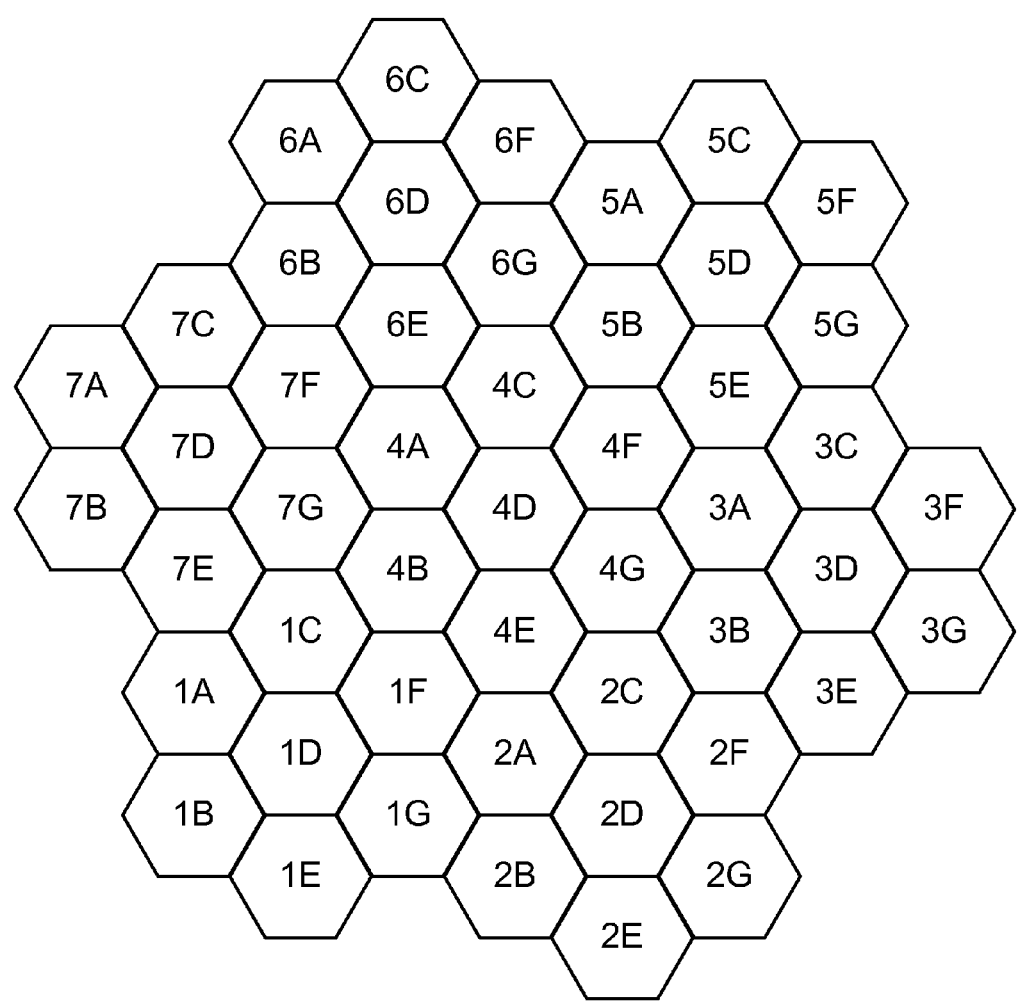
FIG. 23 illustrates a wireless communications system including a plurality of sectors.

FIG. 23 illustrates a wireless communications system 2400 including a plurality of sectors according to an embodiment of the present invention. In particular, the wireless communications system 2400 includes sectors 1A-1G, 2A-2G, 3A-3G, 4A-4G, 5A-5G, 6A-6G and 7A-7G. In FIG. 23, each set of grouped letters corresponds to a different 7 sector cluster. Thus, sectors 1A-1G are collectively a cluster, sectors 2A-2G are collectively a cluster, and so on. For convenience of explanation, the embodiments of the present invention are described below as performed within a 7 sector cluster arrangement. However, as will be appreciated by one of ordinary skill in the art in view of the above remarks, clusters can be configured to correspond to any size, and need not be symmetrical in nature (i.e., in terms of their associated sectors).

Figure 24:
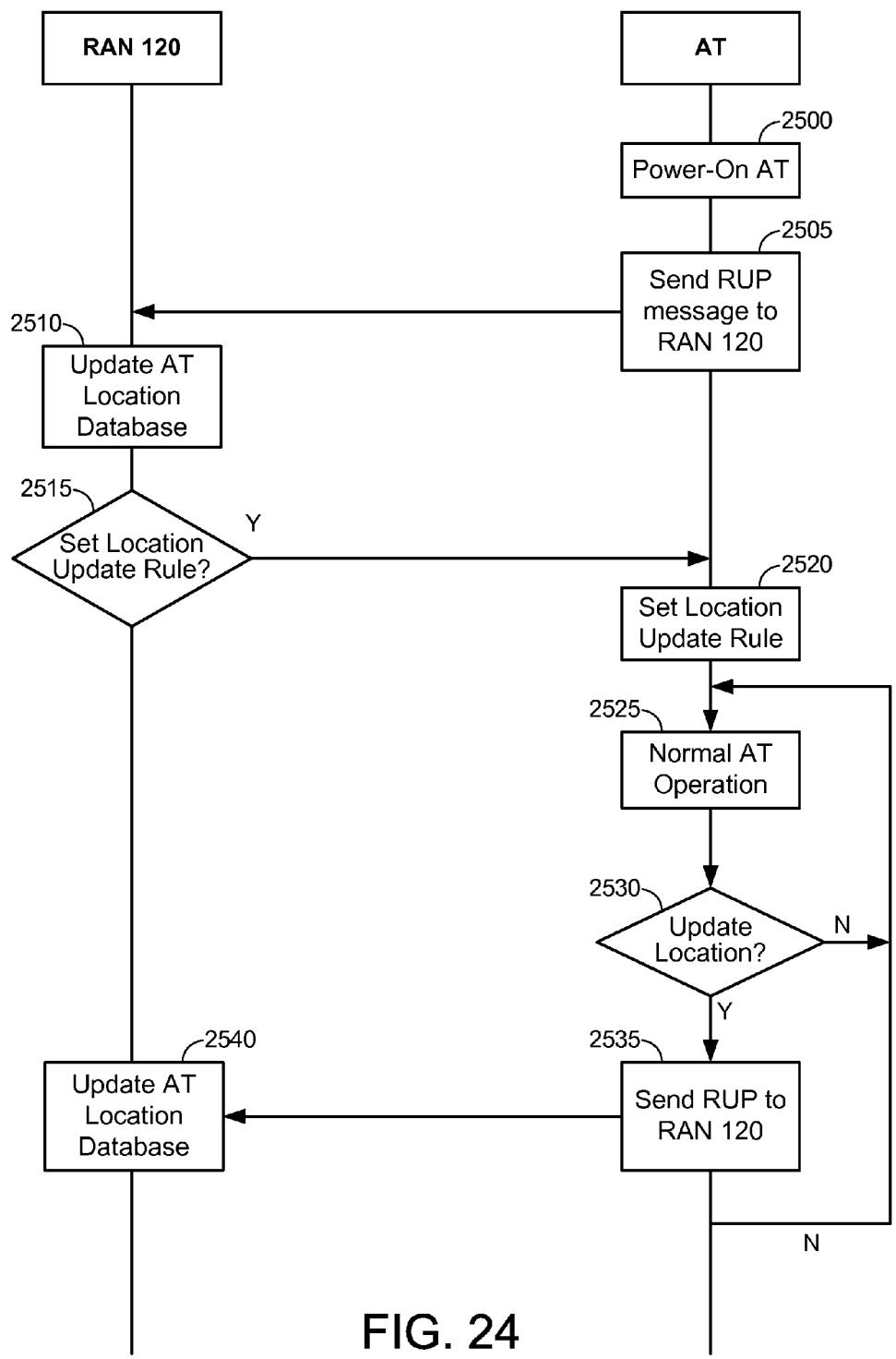
FIG. 24 illustrates a route update process performed within the wireless communications system according to an embodiment of the present invention.

FIG. 24 illustrates a route update process performed within the wireless communications system 2400 according to an embodiment of the present invention. Referring to FIG. 24, 2500, a given AT powers on and transmits a RouteUpdate message (RUP), 2505. For example, referring to FIG. 23, assume that the given AT powers up in sector 7D of cluster 7.

In 2510, the RAN 120 updates a location database indicating AT positions within the wireless communications system 2400. In an example, the RAN 120 can replace a previously reported position of the AT with the new reported position in the RUP. In an alternative example, the RAN 120 can add the new location reported by the AT to the location database without replacing older locations (e.g., to determine a trajectory or path of the AT). The location stored in a location database entry can be either the cluster of the reporting AT, the cluster and sector of the reporting AT, a geographic position of the reporting AT, any combination thereof, etc. In a further example, the reported location of the AT associated with the RUP transmitted in 2505 is stored with an associated timestamp in 2510. Thus, assuming that the AT has an AT identifier (ID) of 878238, two example location database entries for the AT may be as follows:

| ATID | 878238 |
|---|---|
| Time | 5:36 PM |
| Location | Cluster 7 |
| Previous Location(s) | [Cluster 1: 4:27 PM], [Cluster 3: 2:31 PM] |

Location Database Entry

Example 1

| ATID | 878238 |
|---|---|
| Time | 3:33 AM |
| Location | Cluster 4, Sector 4D |
| Previous Location(s) | None. |

Location Database Entry

Example 2

In a further example, while not illustrated in FIG. 24, the RAN 120 may periodically purge the location database of obsolete time entries. For example, an age threshold for RUPs can be established (e.g., 2 hours, 2 days, etc.) such that any RUP older than the age threshold is removed from the location database.

Next, in 2515, the RAN 120 determines a location update rule to be enforced at the AT. For example, the location update rule can be sent to a RUP upon entering a new sector, a new cluster, upon traversing a given geographic distance, etc. Thus, while examples provided above were limited to sending RUPs upon exiting a fixed set of sectors comprising a cluster, in other embodiments of the invention, the cluster can correspond to a geographic range, a collection of sectors, or other geographic partition. Further, the RUP transmission can be based on time. In an example, if an AT determines that it has not sent a RUP for more than a threshold time period, the AT can transmit a RUP irrespective of whether the AT has changed clusters (i.e., to notify the RAN 120 that the AT remains in the cluster). For purposes of example, assume the location update rule determined in 2515 is for the AT to send a new RUP upon exiting a cluster. After determining the location update rule in 2515, the RAN 205 transmits the location update rule to the AT. Alternatively, the location update rule need not be determined and transmitted in 2515. Instead, the AT could execute a default location update rule without instructions from the RAN 120.

In an example, irrespective of whether the location update rule is ordered by the RAN 120 or self-executed by the AT, the location update rule can be configured to be more demanding for ATs that are capable of decoding DOS-announce messages and/or for ATs at which DOS-announce messages are expected to be sent. The location update rule can be made more demanding such that the AT sends RUPs more frequently and the RAN 120 can track the location of the AT with greater precision. For example, the location update rule can be made more demanding by decreasing the route update radius (RUR) or geographic distance that an AT traverses before sending a RUP, by decreasing the threshold time period associated with RUP transmission, and/or increasing/decreasing any other reporting criterion that will result in the RAN 120 better able to track the location of the AT. As will be appreciated by one of ordinary skill in the art, increasing the precision of location tracking for DOS-announce capable ATs can decrease the cluster size associated with a cluster-based DOS flooding implementation, which can save one or more sectors bandwidth on the downlink control channel.

In 2520, the AT sets the location update rule (e.g., received from the RAN 120, or a default location update rule). After setting the location update rule, the AT resumes normal operation (e.g., enters idle mode, makes telephone calls, sends text messages, etc.). In 2530, the AT determines whether to update its location to the RAN 120 by sending a new RUP. Assume that the AT has remained in sector 7D within cluster 7. Accordingly, no RUP is transmitted and the process returns to 2525.

Next, assume that the AT moves from sector 7D of cluster 7 to sector 5F of cluster 5. Accordingly, in a next iteration of 2530, the AT determines to update its location maintained at the RAN 120 by transmitted a new RUP. The AT transmits the RUP, 2535, and the RAN 120 updates its location database entry for the AT, 2540 (e.g., as discussed above with respect to 2510).

Figure 25:
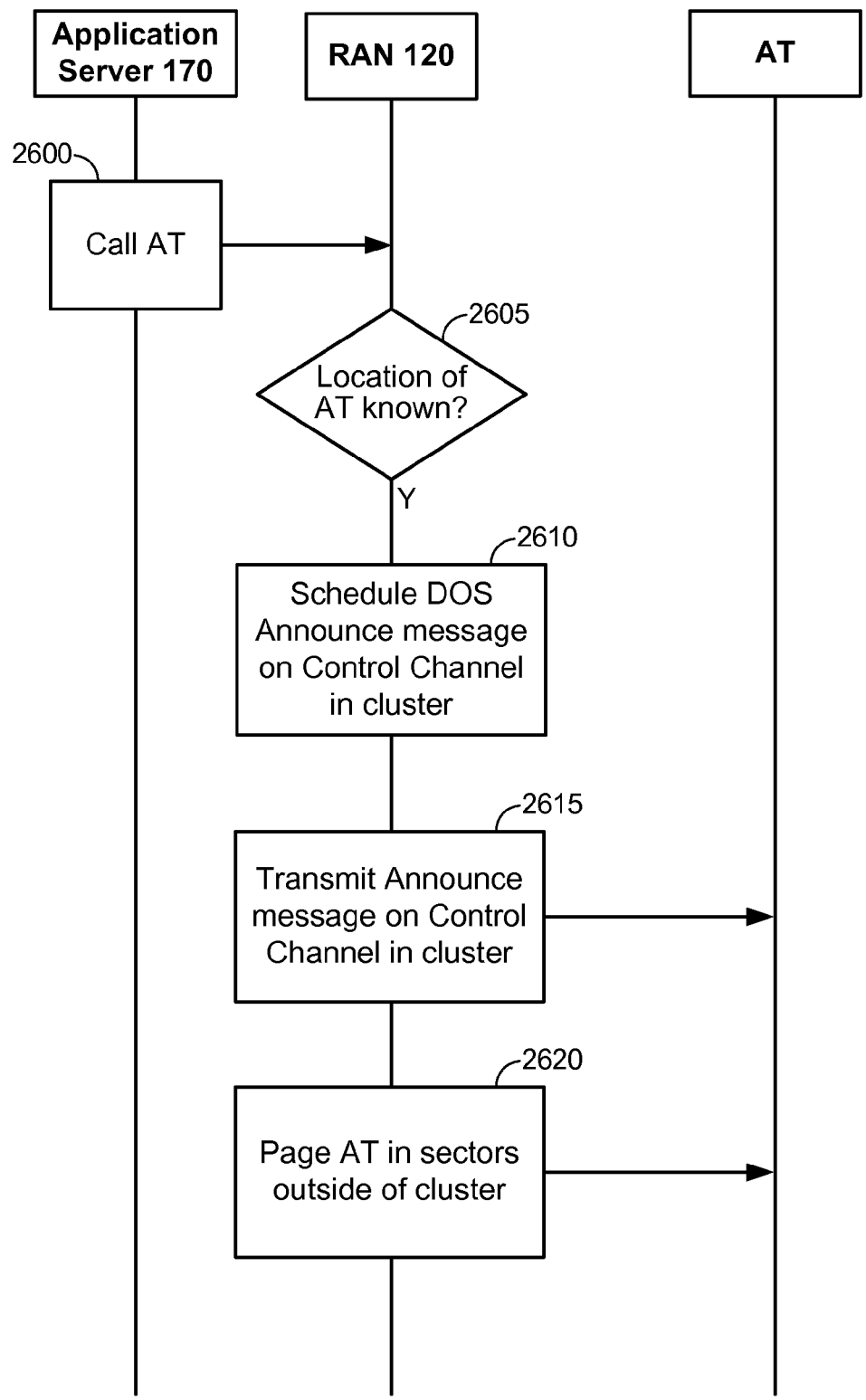
FIG. 25 illustrates a cluster-based announcement process according to an embodiment of the present invention.

FIG. 25 illustrates a cluster-based announcement process according to an embodiment of the present invention. Referring to FIG. 25, in 2600, the application server 170 instructs the RAN 120 (e.g., via the PDSN 160 or BSN 165) to call one or more ATs. For example, the call can be a multicast call, such as for a PTT (e.g., QChat) call. While the call could conceivably be for many ATs (i.e., a multicast call), FIG. 25 will be described below as calling a single AT for convenience of explanation.

In 2605, the RAN 120 determines whether the cluster of the requested AT is known. For example, the RAN 120 can query a location database maintained therein to determine whether the AT has reported any RUPs, and further whether the RUPs are relevant. For example, a RUP that is 3 years old is likely to exceed an age threshold and thereby would not be a good indicator as to the AT's current cluster. Likewise, if a series of RUPs indicates that AT is traveling at a very high speed, the determined cluster may be based on the trajectory of the AT, and not the actual cluster in which the AT last reported. On the other hand, if the AT is slow moving based on its RUP history, for example, the AT's reported cluster may be used as the determined cluster in 2605.

Assuming the RAN 120 can determine a cluster for the AT in 2605, the process advances to 2610. While not illustrated in FIG. 25, if the RAN 120 cannot determine a cluster for the AT, the RAN 120 will send the Announce message via the Standard Paging protocols discussed above (i.e., the RAN 120 sends a page for the AT in all sectors on a downlink paging channel, waits for the paged AT to establish a traffic channel in a given sector and then sends the Announce message to the paged AT in that sector) or via an unconditional Direct DOS flooding protocols discussed above (i.e., the RAN 120 transmits the Announce message on the downlink Control Channel in all sectors).

Accordingly, assume that the given AT is located in sector 5F of cluster 5 and has sent a RUP indicating the given AT's position at cluster 5. Under these assumptions, the RAN 120 schedules a DOS-announce message for the given AT in 2610. As discussed above, DOS-announce messages can be sent on the downlink control channel to page an AT with less delay, on average, than paging the AT on a standard paging channel. However, because it is not typical for the DOS-announce message to consume the entirety of the control channel cycle, there are different ways in which the DOS-announce message can be packaged into the control channel cycle. Examples of scheduling a DOS-announce message for transmission on a control channel are discussed in greater detail below following the description of FIG. 25.

After the DOS-announce message is scheduled, the RAN 120 transmits an Announce message announcing the call (e.g., a multicast or PTT call) to the given AT over the downlink Control Channel in each of sectors 5A through 5G in cluster 5, 2615. Also, the RAN 120 transmits a page for the given AT in each sector belonging to clusters 1, 2, 3, 4, 6 and 7, 2620. Thus, the RAN 120's knowledge of a position estimate of the AT based on the RUPs and maintained at the location database at the RAN 120 permits the RAN 120 to transmit a "localized" or cluster-based control channel announce message, instead of transmitting the announce message over the control channel in all sectors, which consumes significant bandwidth.

While not illustrated in FIG. 25, if the RAN 120 determines the load on the downlink Control Channel in any sector of the determined cluster to be above a load threshold in 2605, the RAN 120 may alternatively execute the Standard Paging protocols in that sector (e.g., to avoid a delay in transmitting the Announce message on the downlink Control Channel while waiting for the Control Channel to become available).

Further, while FIG. 25 is directed as if the call requested in 2600 is a unicast call, it will be appreciated that FIG. 25 can be adapted for multicast implementations as well. For example, the location determining step of 2605 can be configured to determine the clusters for each of a plurality of access terminals (e.g., each multicast group member of the multicast group), and the transmitting step 2615 can transmit the Announce message over a control channel within each determined cluster from 2605 in accordance with the scheduling from 2610 and the transmitting step 2620 can page the plurality of access terminals over a paging channel in sectors outside of each determined cluster.

Scheduling of Dos-Announce Messages within a Control Channel Cycle

As discussed above with respect to 2610 of FIG. 25, there are many different ways in which one or more DOS-announce messages can be scheduled within the cycle of a control channel. Accordingly, four different scheduling methodologies are present below, although other embodiments of the present invention can be directed to different scheduling methodologies or different combinations of the scheduling methodologies described below.

1, Schedule Dos-Announce Messages on Control Channel Capsules

In a first example, the DOS-announce message can be scheduled on a control channel capsule (e.g., either synchronous or sub-synchronous) of the control channel cycle. ATs are typically configured to monitor synchronous and sub-synchronous capsules on the control channel cycle. Thus, a simple way to announce the call for a particular AT is to position the DOS-announce message in a control channel capsule that the AT is already planning on monitoring.

However, while relatively simple to implement, filling control channel capsules with DOS-announce messages causes pages, which otherwise would have occupied the control channel capsules, to be delayed, which increases the standby times of other ATs. If large numbers of DOS-announce messages are sent, the delay can be significant. However, transmitting the DOS-announce messages on control channel capsules may be used, for example, within sectors that do not have heavy page loading. In another example, if the cluster-size is sufficiently small, the DOS-announce message may be sent on a control channel capsule because only a relatively small number of sectors are affected by the increased standby times of standard pages on the control channel.

2. Schedule Dos-Announce Message after a First Mac Packet in the Control Channel Capsule In a second example, the DOS-announce message can be scheduled after a given MAC packet (e.g., a $1^{st}$ MAC packet) in a control channel capsule that completes transmission, and an indicator can be provided on the control channel to indicate that the scheduling of the DOS-announce message is scheduled after the given MAC packet of the synchronous or sub-synchronous capsule. For example, the DOS-announce message can be scheduled within an asynchronous CC capsule.

In an example, the indicator that indicates the scheduling of the DOS-announce message can be a bit in a QuickConfig message. For example, a given field or bit (e.g., ftc valid bit) within the QuickConfig message can be used to convey the scheduling of the DOS-announce message. The DOS-announce message can then be transmitted in a different interlace than the control channel. For example, the DOS-announce message can be addressed to a unicast access terminal identifier (UATI) MAC address that identifies the target AT and included in an asynchronous control channel capsule following the first MAC packet in a synchronous control channel capsule. Thus, a standard message (e.g., QuickConfig message) is used to convey information not typically associated with the standard message (i.e., the DOS-announce message scheduling).

| Field | Length (bits) |
|---|---|
| MessageID | 8 |
| ColorCode | 8 |
| SectorID24 | 24 |
| SectorSignature | 16 |
| AccessSignature | 16 |
| Redirect | 1 |
| RPCCount63To0 | 6 |
| RPCCount63To0 occurrences of the following field | |
| ForwardTrafficValid63To0 | 1 |
| RPCCount127To64Included | 0 or 1 |
| RPCCount127To64 | 0 or 6 |
| RPCCount127To64 occurrences of the following field: | |
| ForwardTrafficValid127To64 | 0 or 1 |
| Reserved | 0-7 (as needed) |

In an alternative example, the indicator that indicates the scheduling of the DOS-announce message can provided within a proprietary message (e.g., a StorageBlobAssignment or StorageBlobRequest for QChat) that indicates, to the AT, that a DOS-announce message will follow the first control channel MAC packet in a given capsule. In this example, the proprietary message can be addressed to the multicast access terminal identifier (MATI) MAC address (e.g., for a multicast call) with a given bit reserved for DOS-announce capable ATs as the indicator, or alternatively to a unicast access terminal identifier (UATI) (e.g., for a unicast call) or to a broadcast access terminal identifier (BATI) (e.g., for a broadcast call). For example, the DOS-announce message can be addressed to the UATI MAC address of the target AT and included in an asynchronous control channel capsule following the first MAC packet in either a synchronous or sub-synchronous control channel capsule. In another example, the DOS message itself need not be transmitted. In this example, the RAN may encapsulate the application layer message inside a StorageBlob message. This approach also applies to other messages aside from announce messages, such as voice media packets.

Figure 26:
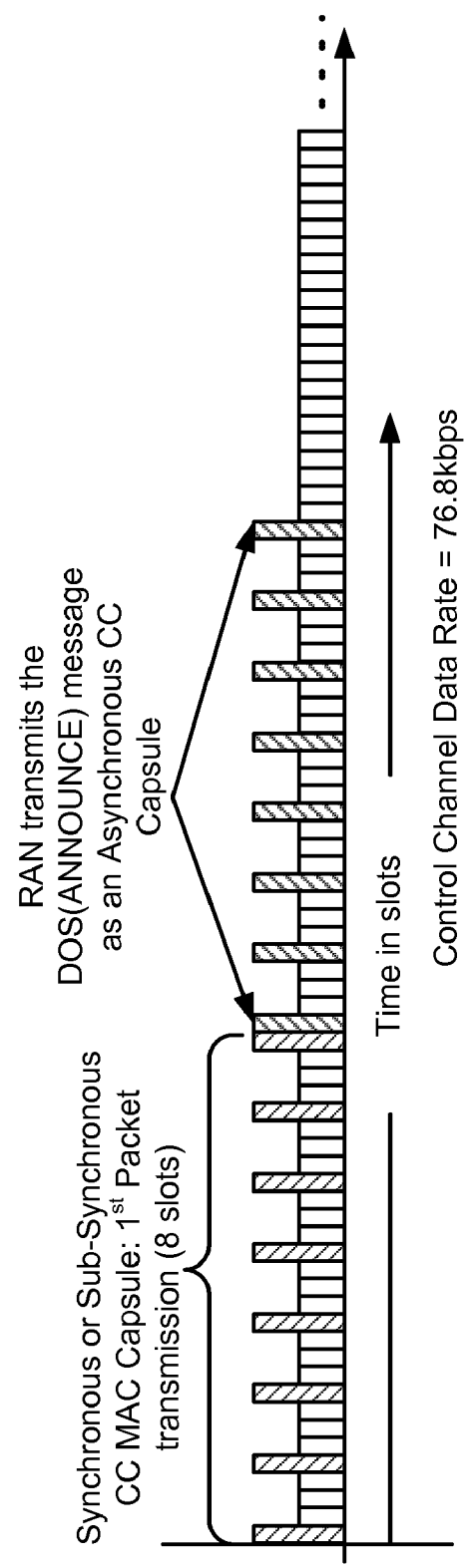
FIG. 26 illustrates the scheduling of an announce message on a control channel cycle of a control channel according to an embodiment of the present invention.

FIG. 26 illustrates the control channel cycle in accordance with either of the above-described embodiments. Referring to FIG. 26, the DOS-announce message is shown as being transmitted in an Asynchronous control channel capsule that follows the first control channel capsule MAC packet (e.g., synchronous or sub-synchronous) in accordance with either indicator embodiment (e.g., QuickConfig message bit or proprietary message).

3. Schedule DOS-Announce Message with a Quick Page Indicator

In a third example, the DOS-announce message can be scheduled on a given asynchronous control channel capsule, and the scheduling of the DOS-announce message can be conveyed to the target AT with a QuickPaging bit on the quick paging channel. In an example, the quick paging channel can be logical or physical, contains the PI bits, and allows the DOS message to be transmitted in an interlace that is decoded in tandem with the synchronous or sub-synchronous CC packet.

Figure 27:
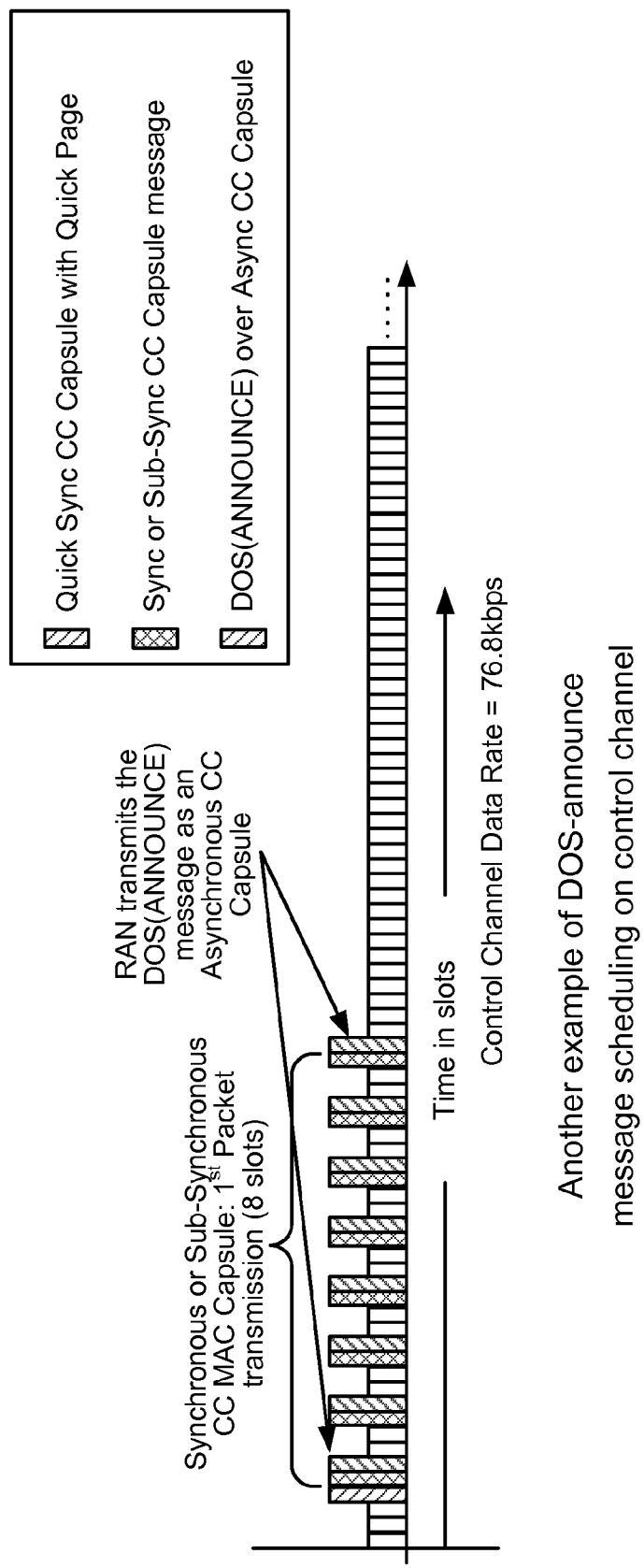
FIG. 27 illustrates the scheduling of an announce message on a control channel cycle according to another embodiment of the present invention.

FIG. 27 illustrates the control channel cycle in accordance the quick page indicator embodiment. Referring to FIG. 27, the DOS-announce message is shown as being transmitted in an Asynchronous control channel capsule that follows the quick synchronous control channel capsule that sets the quick paging indicator bit to indicate the presence of the DOS-announce message. As shown in FIG. 27, the single Quick Sync CC capsule is sufficient to inform an AT of the DOS announce message that that is spread out within the asynchronous control channel capsule.

4. Example Hybrid Implementation

In a fourth example, a hybrid method (i) schedules DOS-announce messages on control channel capsules (e.g., as in the first example in this section, above) and (ii) schedules the DOS-announce message after a first MAC packet in the control channel capsule as indicated by a proprietary message (e.g., as in the second example in this section, above). For example, the proprietary message can be encapsulated as part of a StorageBlobRequest (e.g., a BCMCSFlowRegistration request) or StorageBlobAssignment message in EV-DO, and transmitted in an initial control channel MAC packet in the synchronous or sub-synchronous capsules. While this hybrid method can increase the design complexity over either method applied alone, the delay associated with announce message transmission can be reduced over either method by itself (e.g., assuming the control channel is not overloaded). The hybrid method discussed above is relativel accurate with respect to indicating the presence of the DOS message compared with the QuickPaging channel approach, and can further improve the standby time for each handset.

In another example, the proprietary message discussed above in the second and fourth examples can indicate the presence of any type of message in an asynchronous control channel capsule of the downlink control channel, and not necessarily a DOS announce message. Further, the proprietary message (or other announce message indicators, such as quickpage message, etc.) can indicate the presence of a single announce message as discussed above, or alternatively can indicate the potential presence of multiple announce messages, such that an AT interprets the announce message indicator as a request to check for more than one announce message. Thus, in this example, the AT would not simply cease monitoring for announce messages after decoding a first announce message. In yet another example, the announce message can be staggered across the control channel capsule (e.g., see FIG. 27), and need not be scheduled in consecutive control channel capsule slots.

As will be appreciated by one of ordinary skill in the art, the above-described methodologies regarding cluster-based direct DOS flooding of announce messages can be directed to unicast messaging, or alternatively in a multicast messaging scenario, such as PTT (e.g., QChat). One or more ATs (e.g., multicast group members) are configured to transmit RUPs based on a given location update rule, and the RAN 120 is configured to maintain a database indicating locations of the one or more ATs based on the RUPs. Thereby, the RAN 120 need only transmit control channel announce messages in proximity of the expected location of the ATs instead of the entire network.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of announcing a call to an access terminal in a wireless communications system, comprising:
   receiving, at an access network, a request to call a given access terminal;
   determining whether a cluster to which the given access terminal belongs is known at the access network by querying a location database, the location database including a list of access terminals with each listed access terminal stored in association with one of a plurality of clusters, each of the plurality of clusters including a plurality of sectors of the wireless communications system; and
   transmitting an announce message announcing the requested call to the given access terminal based on the determining step,
   wherein the access network maintains, in the location database, location estimates of access terminals configured to decode announce messages over a downlink control channel with more precision than access terminals that are not configured to decode announce messages over the downlink control channel.

2. The method of claim 1, wherein, if the determining step determines the cluster of the given access terminal is known, the transmitting step transmits the announce message over a control channel within the determined cluster.

3. The method of claim 2, wherein the announce message transmitted over the control channel within the determined cluster is configured as a data over signaling (DOS) message.

4. The method of claim 1, wherein, if the determining step determines the cluster of the given access terminal is known, the transmitting step pages the given access terminal over a paging channel in sectors outside of the determined cluster.

5. The method of claim 1, wherein, if the determining step determines the cluster of the given access terminal is known, the transmitting step transmits the announce message over a control channel within the determined cluster, and the transmitting step pages the given access terminal over a paging channel in sectors outside of the determined cluster.

6. The method of claim 1, wherein, if the determining step determines the cluster of the given access terminal is not known, the transmitting step transmits the announce message over a control channel within each sector of the wireless communications system.

7. The method of claim 6, wherein the announce message transmitted over the control channel within the determined cluster is configured as a data over signaling (DOS) message.

8. The method of claim 1, wherein, if the determining step determines the cluster of the given access terminal is not known, the transmitting step pages the given access terminal over a paging channel in each sector of the wireless communications system, waits for the given access terminal to establish a traffic channel with the access network and transmits the announce message to the given access terminal over the established channel.

9. The method of claim 1, wherein the location database is based upon one or more route update messages received from access terminals within the wireless communications system.

10. The method of claim 9, wherein the one or more route update messages are received from the access terminals in accordance with a location update rule of each access terminal.

11. The method of claim 10, wherein the location update rule is based upon at least one of time, current serving sector, geographic location and distance traveled.

12. A method of announcing a call to an access terminal in a wireless communications system, comprising:
receiving, at an access network, a request to call a given access terminal;
determining whether a cluster to which the given access terminal belongs is known at the access network by querying a location database, the location database including a list of access terminals with each listed access terminal stored in association with one of a plurality of clusters, each of the plurality of clusters including a plurality of sectors of the wireless communications system; and
transmitting an announce message announcing the requested call to the given access terminal based on the determining step
wherein the location database is based upon one or more route update messages received from access terminals within the wireless communications system, and
wherein access terminals configured to decode announce messages over a downlink control channel transmit the route update messages more frequently than access terminals that are not configured to decode announce messages over the downlink control channel.

13. The method of claim 1, wherein the location database includes a location estimate of the given access terminal, and the number of sectors in the cluster is based on a confidence level associated with the location estimate.

14. The method of claim 13, wherein the sectors in the cluster are in physical proximity to the location estimate of the given access terminal.

15. The method of claim 1, wherein the requested call is a unicast call for the given access terminal.

16. The method of claim 1, wherein the requested call is a multicast call for a plurality of access terminals including the given access terminal.

17. The method of claim 16, wherein determining step determines the clusters for each of the plurality of access terminals, and wherein the transmitting step (i) transmits the announce message over a control channel within each determined cluster and (ii) pages the given access terminal over a paging channel in sectors outside of each determined cluster.

18. The method of claim 1, wherein the transmitting step transmits the announce message as a data over signaling (DOS) message on a downlink control channel in at least one sector and less than all sectors in which the announce message is transmitted.

19. The method of claim 1, wherein the transmitting step transmits the announce message in a synchronous or subsynchronous control channel capsule of a downlink control channel.

20. The method of claim 1, further comprising:
transmitting an announce message indicator that indicates the presence of the transmitted announce message to the given access terminal.

21. The method of claim 20, wherein the announce message is transmitted in an asynchronous control channel capsule of a downlink control channel.

22. The method of claim 20, wherein the announce message is transmitted after a first MAC packet of the control channel capsule.

23. The method of claim 20, wherein the announce message indicator is one of a QuickConfig message, or a quick paging bit on a quick paging channel.

24. An apparatus configured to announce a call to an access terminal in a wireless communications system, comprising:
means for receiving, at an access network, a request to call a given access terminal;
means for determining whether a cluster to which the given access terminal belongs is known at the access network by querying a location database, the location database including a list of access terminals with each listed access terminal stored in association with one of a plurality of clusters, each of the plurality of clusters including a plurality of sectors of the wireless communications system; and
means for transmitting an announce message announcing the requested call to the given access terminal based on the means for determining,
wherein the access network maintains, in the location database, location estimates of access terminals configured to decode announce messages over a downlink control channel with more precision than access terminals that are not configured to decode announce messages over the downlink control channel.

25. The apparatus of claim 24, wherein, if the means for determining determines the cluster of the given access terminal is known, the means for transmitting transmits the announce message over a control channel within the determined cluster.

26. The apparatus of claim 25, wherein the announce message transmitted over the control channel within the determined cluster is configured as a data over signaling (DOS) message.

27. The apparatus of claim 25, wherein, if the means for determining determines the cluster of the given access terminal is known, the means for transmitting pages the given access terminal over a paging channel in sectors outside of the determined cluster.

28. The apparatus of claim 24, wherein, if the means for determining determines the cluster of the given access terminal is known, the means for transmitting transmits the announce message over a control channel within the determined cluster, and the means for transmitting pages the given access terminal over a paging channel in sectors outside of the determined cluster.

29. The apparatus of claim 24, wherein, if the means for determining determines the cluster of the given access terminal is not known, the means for transmitting transmits the announce message over a control channel within each sector of the wireless communications system.

30. The apparatus of claim 29, wherein the announce message transmitted over the control channel within the determined cluster is configured as a data over signaling (DOS) message.

31. The apparatus of claim 24, wherein, if the means for determining determines the cluster of the given access terminal is not known, the means for transmitting pages the given access terminal over a paging channel in each sector of the wireless communications system, waits for the given access terminal to establish a traffic channel with the access network and transmits the announce message to the given access terminal over the established channel.

32. The apparatus of claim 24, wherein the location database is based upon one or more route update messages received from access terminals within the wireless communications system.

33. The apparatus of claim 32, wherein the one or more route update messages are received from the access terminals in accordance with a location update rule of each access terminal.

34. The apparatus of claim 33, wherein the location update rule is based upon at least one of time, current serving sector, geographic location and distance traveled.

35. The apparatus of claim 24, wherein the location database includes a location estimate of the given access terminal, and the number of sectors in the cluster is based on a confidence level associated with the location estimate.

36. The apparatus of claim 35, wherein the sectors in the cluster are in physical proximity to the location estimate of the given access terminal.

37. The apparatus of claim 24, wherein the requested call is a unicast call for the given access terminal.

38. The apparatus of claim 24, wherein the requested call is a multicast call for a plurality of access terminals including the given access terminal.

39. The apparatus of claim 38, wherein means for determining determines the clusters for each of the plurality of access terminals, and wherein the means for transmitting (i) transmits the announce message over a control channel within each determined cluster and (ii) pages the given access terminal over a paging channel in sectors outside of each determined cluster.

40. The apparatus of claim 24, wherein the means for transmitting transmits the announce message as a data over signaling (DOS) message on a downlink control channel in at least one sector and less than all sectors in which the announce message is transmitted.

41. The apparatus of claim 24, wherein the means for transmitting transmits the announce message in a synchronous or sub-synchronous control channel capsule of a downlink control channel.

42. The apparatus of claim 24, further comprising:
means for transmitting an announce message indicator that indicates the presence of the transmitted announce message to the given access terminal.

43. The apparatus of claim 42, wherein the announce message is transmitted in an asynchronous control channel capsule of a downlink control channel.

44. The apparatus of claim 42, wherein the announce message is transmitted after a first MAC packet of the control channel capsule.

45. The apparatus of claim 42, wherein the announce message indicator is one of a QuickConfig message, or a quick paging bit on a quick paging channel.

46. An apparatus configured to announce a call to an access terminal in a wireless communications system, comprising:
logic configured to receive, at an access network, a request to call a given access terminal;
logic configured to determine whether a cluster to which the given access terminal belongs is known at the access network by querying a location database, the location database including a list of access terminals with each listed access terminal stored in association with one of a plurality of clusters, each of the plurality of clusters including a plurality of sectors of the wireless communications system; and
logic configured to transmit an announce message announcing the requested call to the given access terminal based on the logic configured to determine,
wherein the access network maintains, in the location database, location estimates of access terminals configured to decode announce messages over a downlink control channel with more precision than access terminals that are not configured to decode announce messages over the downlink control channel.

47. A non-transitory computer readable medium including instructions thereon that may be utilized by one or more processors, the instructions configured to announce a call to an access terminal in a wireless communications system, the instructions comprising:
instructions to receive, at an access network, a request to call a given access terminal;
instructions to determine whether a cluster to which the given access terminal belongs is known at the access network by querying a location database, the location database including a list of access terminals with each listed access terminal stored in association with one of a plurality of clusters, each of the plurality of clusters including a plurality of sectors of the wireless communications system; and
instructions to transmit an announce message announcing the requested call to the given access terminal based on the instructions to determine,
wherein the access network maintains, in the location database, location estimates of access terminals configured to decode announce messages over a downlink control channel with more precision than access terminals that are not configured to decode announce messages over the downlink control channel.

* * * * *